US006984110B2

(12) United States Patent
Jang

(10) Patent No.: US 6,984,110 B2
(45) Date of Patent: Jan. 10, 2006

(54) WINDMILL BLADE AND APPARATUS FOR GENERATING POWER USING THE BLADE

(76) Inventor: Keun-Suk Jang, 106-703, Shinik Kangbyeon Town 1-Cha, 480, Shinpyeong 2-Dong, Saha-Gu, Busan (KR) 604-032

( * ) Notice: Subject to any disclaimer, the term of this patent is extended or adjusted under 35 U.S.C. 154(b) by 0 days.

(21) Appl. No.: 10/490,010

(22) PCT Filed: Sep. 18, 2002

(86) PCT No.: PCT/KR02/01757

§ 371 (c)(1),
(2), (4) Date: Mar. 18, 2004

(87) PCT Pub. No.: WO03/025389

PCT Pub. Date: Mar. 27, 2003

(65) Prior Publication Data

US 2004/0258524 A1    Dec. 23, 2004

(30) Foreign Application Priority Data

Sep. 19, 2001  (KR) ............................... 2001-58058
Jan. 15, 2002  (KR) ............................. 2002-1197 U
Aug. 22, 2002  (KR) ............................... 2002-49771

(51) Int. Cl.
  *F03D 7/04*    (2006.01)
(52) U.S. Cl. ............................ 416/23; 416/41; 416/44; 416/48; 416/87; 416/88; 416/132 B; 416/144
(58) Field of Classification Search ................. 416/23, 416/37, 41, 44, 48, 87, 88, 132 B, 158, 144
See application file for complete search history.

(56) References Cited

U.S. PATENT DOCUMENTS 1,469,064 A * 9/1923 Zucker ........................ 416/41
4,382,190 A * 5/1983 Jacobson ................ 416/132 B
4,818,180 A   4/1989 Liu
6,902,370 B2 * 6/2005 Dawson et al. ............... 416/87

FOREIGN PATENT DOCUMENTS

| GB | 1188946 A | * | 4/1970 |
| JP | 57-32076 |   | 2/1982 |
| JP | 2-130270 |   | 5/1990 |
| JP | 09-195921 |  | 7/1997 |

* cited by examiner

*Primary Examiner*—Christopher Verdier
(74) *Attorney, Agent, or Firm*—Ladas & Parry LLP

(57) ABSTRACT

Disclosed is a wind power generating apparatus in which windmill blades are mounted in a multi-stage fashion to a rotating shaft while being spaced apart from one another to efficiently generate wind power. Each windmill blade includes blade bodies mounted to the rotating shaft, and provided with wind pressure adjusting holes, wind pressure adjusting plates coupled to each blade body, and connected together to a wire, each wind pressure adjusting plate being slidable along guides respectively arranged at opposite sides of the associated wind pressure adjusting hole to adjust an opening degree of the wind pressure adjusting hole, elastic members each adapted to connect one end of the associated wire to the associated blade body, and winches each adapted to connect the other end of the associated blade body, the winches being mounted to a single shaft to simultaneously wind or unwind all wire.

10 Claims, 27 Drawing Sheets

WINDMILL BLADE AND APPARATUS FOR GENERATING POWER USING THE BLADE

TECHNICAL FIELD

The present invention relates to an apparatus for generating power using wind force, and more particularly to a windmill blade capable of varying the wind pressure receiving area thereof depending on a variation in the force of wind, thereby achieving an enhancement in the efficiency of utilizing the pressure of wind without being damaged by strong force of wind.

BACKGROUND ART

Generally, a windmill is a device for generating power using the force of an air flow which is spontaneously generated in the Earth's atmosphere, and then dissipated. Such a windmill includes at least one blade adapted to receive a lift force caused by the force of a wind so that it rotates.

Such a windmill blade should have a construction capable of generating a lift force even when it receives a weak wind force, while rotating continuously and smoothly without being damaged by a strong wind force. In order to generate a lift force with a weak wind force, the windmill blade should have a large area. On the other hand, in order to prevent the windmill blade from being damaged by a strong wind force, the windmill blade should have a small area. Thus, the windmill blade should satisfy these two opposing conditions.

In spite of such a fact, early windmill blades had a large surface area in order to receive an increased amount of wind force. For this reason, they were often damaged by a strong wind force. However, windmill blades recently developed have a cured structure having a certain skew angle, so that they have an improved wind force utilization efficiency without being damaged by a strong wind force.

However, all of these conventional windmill blades have a structural drawback in that they cannot cope with a variation in wind force. In order to solve this problem, a new windmill blade has been proposed which is capable of varying its angle depending on a variation in the velocity of wind, thereby varying the area receiving the force of the wind.

In such a windmill blade capable of adjusting the angle thereof, the angle adjustment can be easily achieved when the wind force is weak. However, where the wind force is strong, it is difficult to adjust the angle of the blade because resistance to the wind force increases.

Referring to FIG. 32, a conventional wind power generating device is illustrated. As shown in FIG. 32, the conventional wind power generating device includes an iron tower 200 installed on the ground, and a windmill blade 210 mounted to the rear end of a rotating shaft 210A. The rotating shaft 210A is rotatably supported by a bearing 220 mounted on an upper end of the iron tower 200.

The wind power generating device also includes a power transmission unit 230 serving as means for transmitting wind power generated in accordance with the rotation of the windmill blade 210 to a device adapted to use the wind power. The power transmission unit 230 includes a transmission shaft 234 extending downwardly at a front portion of the rotating shaft 210A. The transmission shaft 234 is connected, at its upper end, with the rotating shaft 210A by an upper bevel gear 231. The lower end of the transmission shaft 234 is connected to the wind power using device by a lower bevel gear 232 supported by a support die 233 mounted to the iron tower 200 so that it can transmit wind power to the wind power using device.

However, the above mentioned conventional wind power generating device generates little wind power because it uses the single windmill blade to generate the wind power. Furthermore, there is no means for changing the direction of the windmill blade depending on a variation in the direction of wind. For this reason, the conventional wind power generating device exhibits a low efficiency of generating wind power. As a result, there is a problem in that it is impossible to obtain a large quantity of power from such a conventional device.

DISCLOSURE OF THE INVENTION

Therefore, the present invention has been made in view of the above mentioned problems involved with the conventional device, and an object of the invention is to provide a windmill blade capable of varying the wind pressure receiving area thereof depending on a variation in the force of wind, thereby achieving an enhancement in the efficiency of utilizing the pressure of wind without being damaged by strong force of wind.

Another object of the invention is to provide a wind power generating apparatus which includes multistage windmill blade assemblies adapted to generate high wind power while being pivotable or turnable to cope with a variation in the direction of wind, thereby being capable of achieving an enhancement in the efficiency of generating wind power.

Another object of the invention is to provide a wind power generating apparatus which includes multi-stage windmill blade assemblies spaced apart from one another to efficiently generate wind power, and a balance weight adapted to eliminate a possible weigh imbalance between front and rear portions of a rotating shaft caused by the multi-state windmill blade assemblies arranged on the rotating shaft while being spaced apart from one another, thereby preventing the rotating shaft from being eccentric.

In accordance with one aspect, the present invention provides a windmill blade comprising: blade bodies mounted to a rotating shaft to form a blade assembly, each of the blade bodies receiving pressure of wind while being provided with a plurality of wind pressure adjusting holes; a plurality of wind pressure adjusting plates coupled to each of the blade bodies while being connected together to an associated one of wires, each of the wind pressure adjusting plates being slidable along guides respectively arranged at opposite sides of an associated one of the wind pressure adjusting holes provided at an associated one of the blade bodies, thereby adjusting an opening degree of the associated wind pressure adjusting hole; elastic members each adapted to connect one end of an associated one of the wires to one side portion of an associated one of the blade bodies; winches each adapted to connect the other end of an associated one of the wires to the other side portion of an associated one of the blade bodies, the winches being mounted to a single shaft to to simultaneously wind or unwind the wires; and means for driving the winches.

The driving means may comprise a pinion gear mounted to the shaft carrying the winches, and a rack gear engaged with the pinion gear, and a cylinder connected to the rack gear, and adapted to perform extension and retraction operations for linearly moving the rack gear in accordance with a variation in wind force.

Alternatively, the driving means may comprise a worm mounted to the shaft carrying the winches, and a worm gear engaged with the worm, and a reduction motor connected to the worm gear, and adapted to rotate the worm gear in accordance with a variation in wind force.

Preferably, the wind pressure adjusting holes formed at each of the blade bodies are arranged in several columns in a longitudinal direction of the blade body. Each of the wind pressure adjusting plates respectively associated with the wind pressure adjusting holes may comprise upper and lower wind pressure adjusting plates configured to be sequentially slidable in longitudinal directions, thereby sequentially opening or closing the associated wind pressure adjusting hole. The lower wind pressure adjusting plate may be connected to the blade body by an elastic member. The upper and lower wind pressure adjusting plates are preferably connected to each other by engagement jaws formed at facing ends of the upper and lower wind pressure adjusting plates. The upper wind pressure adjusting plate is preferably connected to an associated one of the wires at an end thereof opposite to the end thereof carrying an associated one of the engagement jaws.

In accordance with another aspect, the present invention provides a windmill blade comprising: blade bodies mounted to a rotating shaft to form a blade assembly, each of the blade bodies receiving pressure of wind while being provided with a plurality of wind pressure adjusting holes; a plurality of wind pressure adjusting plates coupled to each of the blade bodies while being connected to chairs each forming a loop, respectively, each of the wind pressure adjusting plates being slidable along guides respectively arranged at opposite sides of an associated one of the wind pressure adjusting holes provided at an associated one of the blade bodies, thereby adjusting an opening degree of the associated wind pressure adjusting hole; a plurality of first sprockets mounted to one side portion of an associated one of the blade bodies, each of the first sprockets supporting one side portion of an associated one of the chains; a plurality of second sprockets Mounted to a single shaft, each of the second sprockets supporting the other side portion of an associated one of the chains to rotate an associated one of the first sprockets in a clockwise or counterclockwise direction; and means for driving the second sprockets.

The driving means may comprise a reduction motor directly connected to the shaft carrying the second sprockets by a coupling member.

Preferably, the wind pressure adjusting holes formed at each of the blade bodies are arranged in a lateral direction of the blade body. Each of the wind pressure adjusting plates respectively associated with the wind pressure adjusting holes may comprise upper and lower wind pressure adjusting plates configured to be sequentially slidable in lateral directions, thereby sequentially opening or closing the associated wind pressure adjusting hole. Preferably, the upper and lower wind pressure adjusting plates are connected to each other by engagement jaws formed at facing ends of the upper and lower wind pressure adjusting plates. The lower wind pressure adjusting plate my be connected to an associated one of the chains, via an associated one of the first sprockets, at an end thereof opposite to the end thereof carrying an associated one of the engagement jaws.

In accordance with another aspect, the present invention provides a windmill blade comprising: blade bodies mounted to a rotating shaft to form a blade assembly, each of the blade bodies receiving pressure of wind while being provided with a plurality of wind pressure adjusting holes; a plurality of wind pressure adjusting plate pairs coupled to each of the blade bodies in association with the wind pressure adjusting holes, respectively, each of the wind pressure adjusting plate pairs comprising upper and lower wind pressure adjusting plates being slidable along guides respectively arranged at opposite sides of the associated wind pressure adjusting hole, thereby adjusting an opening degree of the associated wind pressure adjusting hole; first cylinders each adapted to slide the upper wind pressure adjusting plate of an associated one of the wind pressure adjusting plate pairs along the guides associated with the associated wind pressure adjusting plate pair; and second cylinders each mounted to the upper wind pressure adjusting plate of an associated one of the wind pressure adjusting plate pair, and adapted to slide the lower wind pressure adjusting plate of the associated wind pressure adjusting plate pair along the guides associated with the associated wind pressure adjusting plate pair.

In accordance with another aspect, the present invention provides a wind power generating apparatus for transmitting a rotating force of windmill blades rotated by wind to a wind power utilizing device via a power transmission unit, comprising: primary, secondary, and third windmill blades mounted to a rotating shaft on at least one iron tower while being arranged along the rotating shaft, each of the windmill blades having a configuration according to any one of the above described aspect; and a turning unit for tuning a windmill support die connected to the rotating shaft carrying the primary, secondary, and third windmill blades along a circular rail supported by the iron tower, the windmill support die being slidably supported by upper and lower rollers.

Preferably, the primary windmill blade is arranged at a front portion of the rotating shaft, and the secondary and third windmill blades are arranged at a rear portion of the rotating shaft. In this case, a balance weight is arranged at a front end of the rotating shaft to balance the rotating shaft.

BRIEF DESCRIPTION OF THE DRAWINGS

The above objects, and other features and advantages of the present invention will become more apparent after a reading of the following detailed description when taken in conjunction with the drawings, in which.

BEST MODE FOR CARRYING OUT THE INVENTION

Now, preferred embodiments of the present invention will be described in detail with reference to the annexed drawings.

Figure 1:
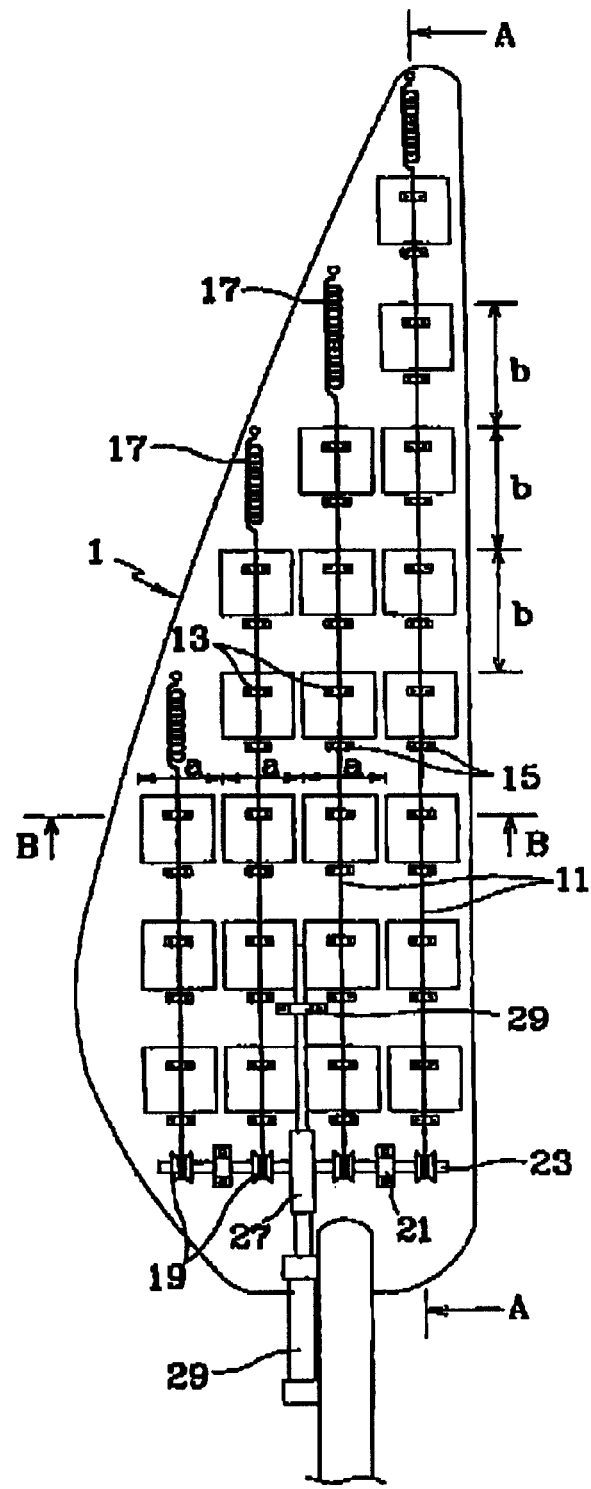
FIG. 1 is a front view illustrating an example of a windmill blade according to the present invention.

FIG. 1 is a front view illustrating an example of a windmill blade according to the present invention. The windmill blade includes blade bodies 1 each having a desired shape. Three blade bodies 1 are arranged along a rotation direction while being uniformly spaced apart from one another. The blade bodies 1 form a blade assembly, that is, the windmill blade, adapted to receive pressure of wind to rotate.

Figure 2:
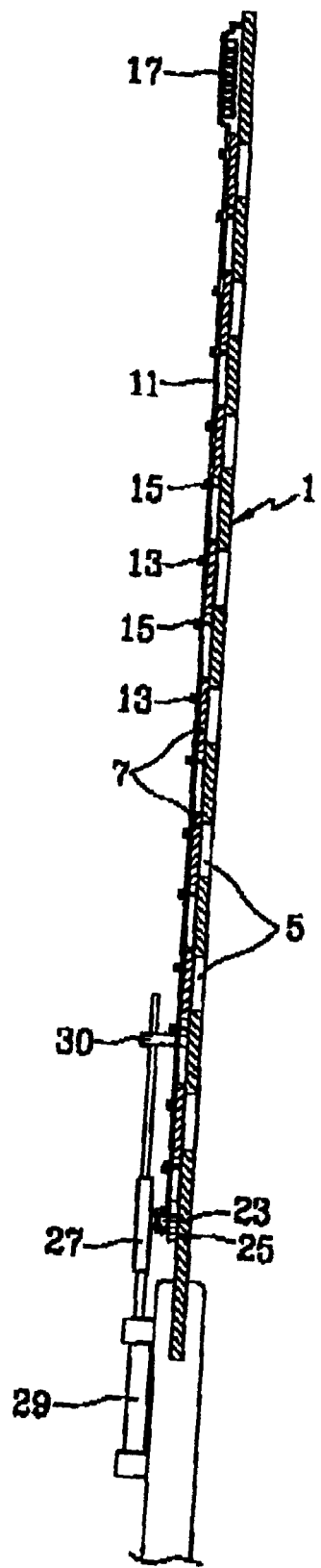
FIG. 2 is a cross-sectional view taken along the line A—A of FIG. 1.
Figure 3:
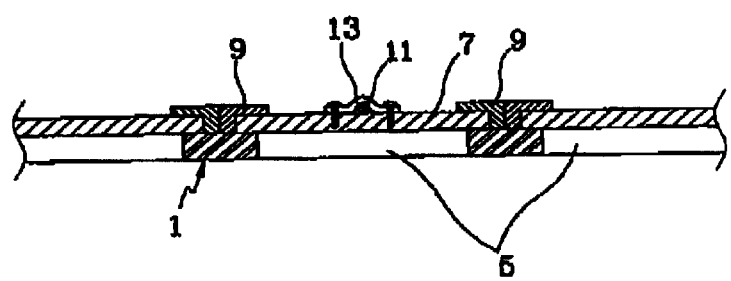
FIG. 3 is a cross-sectional view taken along the line B—B of FIG. 1.
Figure 4:
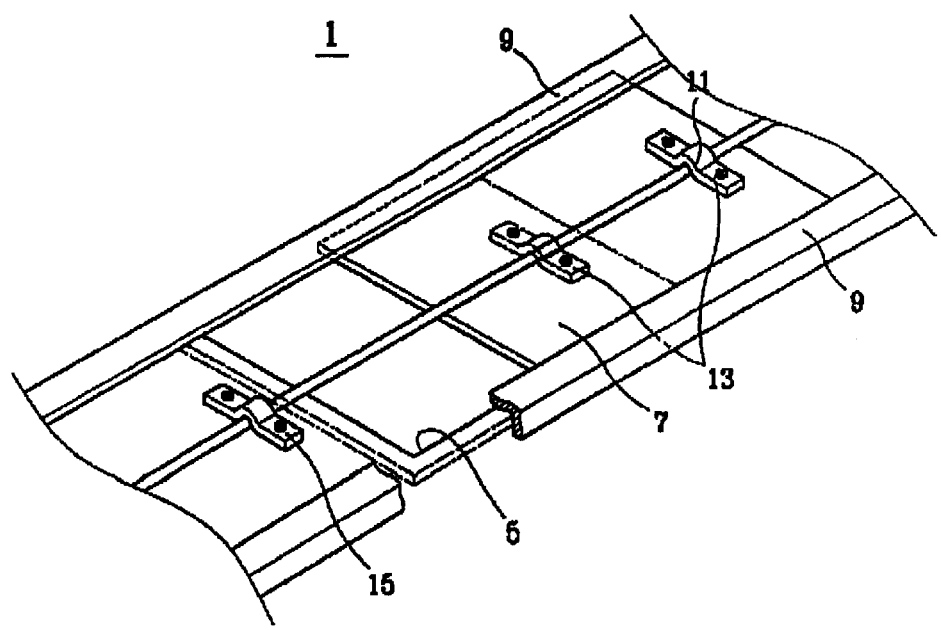
FIG. 4 is a partially-broken perspective view illustrating an exile of a wind pressure adjusting plate according to the present invention.

As shown in FIGS. 2, 3, and 4, each blade body 1 is provided with a plurality of wind pressure adjusting holes S arranged while being uniformly spaced apart from one another. Each wind pressure adjusting hole 5 is adapted to vary the wind pressure receiving area thereof depending on a variation in the force of wind.

The wind pressure adjusting holes 5 are arranged in several columns. Preferably, the space, a, between adjacent columns of the wind pressure adjusting holes is uniform. The space, b, between adjacent wind pressure adjusting holes 5 in each wind pressure adjusting hole column is also preferably uniform in order to prevent the pressure of wind from being applied to a portion of the blade body 1 in a concentrated fashion to deform the blade body 1.

A wind pressure adjusting plate 7 is provided at each wind pressure adjusting hole 5 in order to adjust the opening degree of the wind pressure adjusting hole 5. When the opening degree of each wind pressure adjusting hole 5 is adjusted by the associated wind pressure adjusting plate 7, the wind pressure receiving area of the blade body 1 is adjusted. For example, when the wind pressure adjusting hole 5 is closed, the wind pressure receiving area of the blade body 1 is increased In this case, the windmill blade can be rotated even by weak force of wind. On the other hand, when the wind pressure adjusting hole 5 is opened, the wind pressure receiving area of the blade body 1 is decreased. In this case, the windmill blade including the blade body 1 can be prevented from being damaged by strong force of wind.

In order to make each wind pressure adjusting plate 7 slide smoothly, thereby causing the associated wind pressure adjusting hole 5 to be reliably opened and closed, guides 9 are provided at opposite lateral ends of the wind pressure adjusting hole S, respectively. The guides 9 extend in a longitudinal direction of the blade body 1. The wind pressure adjusting plate 7 is engaged with the guides 9 in such a fashion that it is slidable along the guides 9. Each wind pressure adjusting plate 7 is connected with ocher wind pressure adjusting plates 7 Banged adjacent thereto by a wire 11. Thus, the wind pressure adjusting plates 7 arranged in the same column are simultaneously slidable. In each column, the associated wire 11 is fixed to each wind pressure adjusting plate 7 by a fixing clamp 13 while being slidably supported by a guide clamp 15 at a portion of the blade body 1 between adjacent wind pressure adjusting plates 7.

In order to control the wind pressure adjusting plate 7 in each column, the associated wire 11 is fixedly mounted to one side portion of the blade body 1 via an elastic member 17 at one end thereof, while being fixedly mounted to the other side portion of the blade body 1 via a winch 19 at the other end thereof.

Each elastic member 17 applies its tensile force to one end of the associated wire 11, thereby causing the wind pressure adjusting plates 7, to which the wire 11 is fixed, to be always urged in a direction of opening the associated wind pressure adjusting holes 5. Each winch 19 winds the associated wire 11 against the elastic force of the associated elastic member 17, and unwinds the wire 11, thereby adjusting the opening degree of each wind pressure adjusting hole 5 associated therewith. That is, since the tensile force of the elastic member 11 is always applied to the associated wind pressure adjusting plates 7 via the wire 11, the associated wind pressure adjusting holes 5 are gradually closed as the wire 11 is wound around the winch 19, while being gradually opened as the wire 11 is unwound from the winch 19.

All winches 19 are mounted on a single shaft 23 supported by shaft support members 21 mounted to the blade body 1 so that they are simultaneously rotated by drive means. The drive mean comprises a pinion gear 25 mounted to the shaft 23, a rack gear 27 engaged with the pinion gear 25, and a cylinder 29 coupled to the rack gear 27. The pinion gear 25 engaged with the rack gear 27 performs rotating movements in accordance with linear reciprocating movements of the rack gear 27. The rack gear 27 is supported by a slide member 30 receiving a leading end of the rack gear 27 so that it is linearly slidable along the blade body 1 while being guided by the slide member 30. The cylinder 29 is mounted to a desired portion of the blade body 1, and adapted to perform extension and retraction operations in accordance with a variation in the force of wind applied to the blade body 1.

Figure 5:
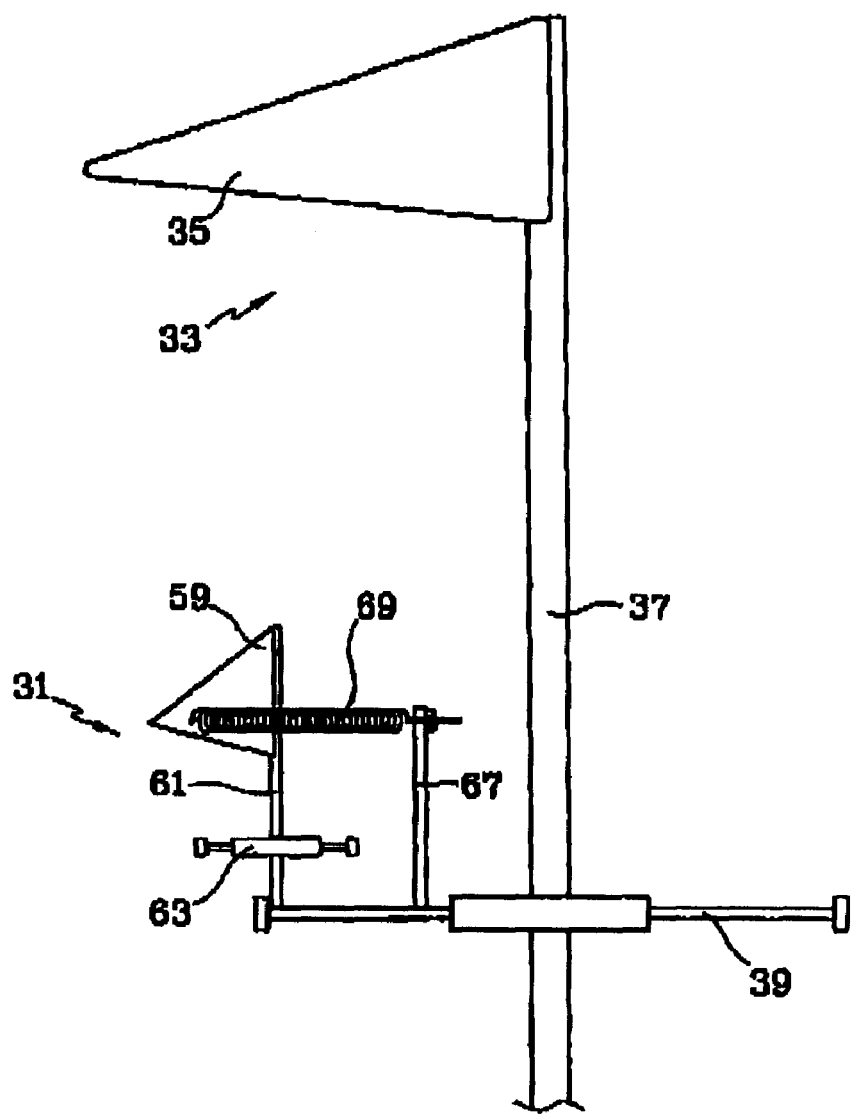
FIG. 5 is a front view illustrating wind direction sensing means and wind force sensing means according to the present invention.
Figure 6:
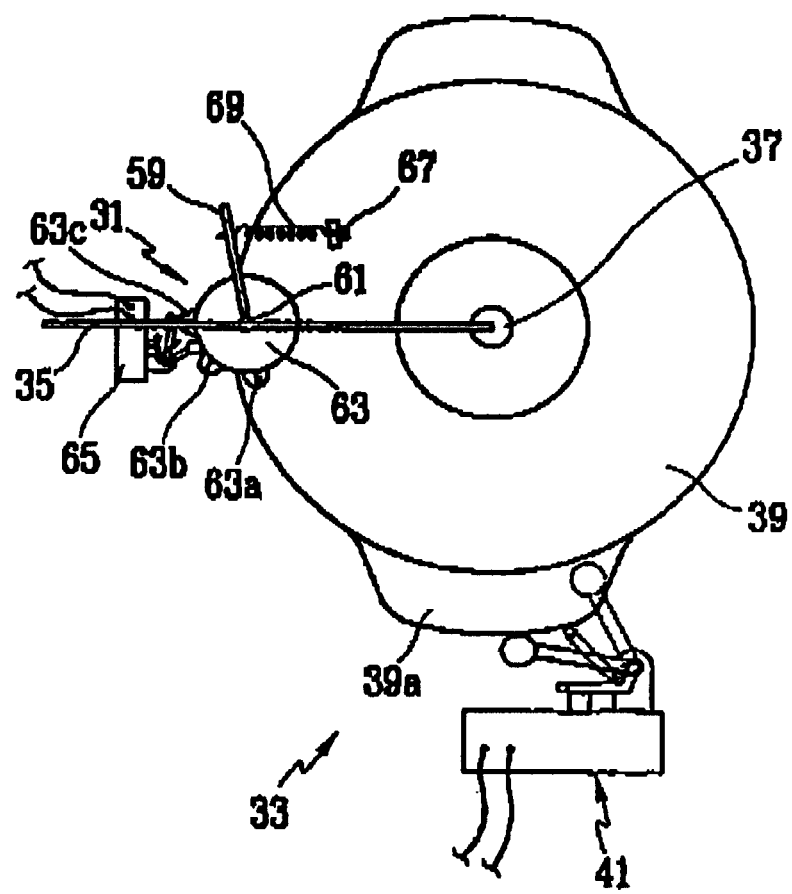
FIG. 6 is a plan view illustrating the wind direction sensing means and wind force sensing means of FIG. 5.

In order to control the wind pressure receiving area of the blade body 1 in accordance with the operation of the cylinder 29, wind force sensing means 31 and wind direction sensing means 33 are provided, as shown in FIGS. 5 and 6. The wind force sensing means 31 is mounted on the wind direction sensing means 33. Accordingly, the wind direction sensing means 33 will be first described.

The wind direction sensing means 33 includes a wind direction indicator 35. The wind direction indicator 35 is mounted to one end of a shaft 37, A first cam plate 39 is attached to a middle portion of the shaft 37 so that it rotates along with the shaft 37, A first limit switch 41 is arranged at a desired portion of the periphery of the first cam plate 39. The first limit switch 41 serves to generate an electrical signal.

The first cam plate 39 and first limit switch 41 are operationally connected such that the first limit switch 41 is switched on when it cones into contact with a protruded cam 39a provided at the first cam plate 39.

In response to an ON or OFF signal from the first limit switch 41, a wind direction control magnet switch (not shown) is controlled so that the windmill blade is oriented perpendicular to the direction of wind.

This operation and the construction associated with the operation will be described in more detail with reference to FIG. 7. A rotating shaft 45 is fitted in a boss 43 to which the windmill blade is mounted. The rotating shaft 45 is supported by a housing 47 while extending through a housing 47. The housing 47 has a braking surface 49. A bring member 53 activated by an electromagnet 51 is arranged adjacent to the braking surface 49. When the braking member 53 applies a braking force to the braking surface 49 in accordance with an operation of the electromagnet 51, the housing 47 is prevented from pivoting. The electromagnet 51 is controlled by a wind direction controlling magnet switch 42 connected to an external power source.

When wind varies in direction, the wind direction sending means 33 pivots in response to the wind direction variation. As a result, the first limit switch 41 is switched on or off by the first cam plate 39, thereby causing the wind direction controlling magnet switch 42 to be switched on or off. In accordance with the ON or OFF state of the wind direction controlling magnet switch 42, the pivoting operation of the housing 47 carried out via the electromagnet 51, braking meter 53 and braking surface 49 is braked or allowed.

The reason why the pivoting operation of the housing 47 is braked or allowed will now be described. It is assumed that the protruded cam 39a is associated with a most frequent direction of wind determined based on data of seasonal variations in wind direction at a place where the wind power generating apparatus is installed. It is also assumed that southwestern wind and northeasterly wind are mainly generated in all seasons at the place where the wind power generating apparatus is installed. When the wind generated at that place varies in direction from a southwesterly wind to a northeasterly wind, the first cam plate 39 pivots 180°, thereby switching off and subsequently switching on the first limit switch 41. As a result, the housing 47 is allowed to pivot for a moment, and then prevented again from pivoting. In the period in which the housing 47 is allowed to pivot, the windmill blade is pivoted, by the force of the wind applied thereto, in a direction facing the direction of the wind. After such a direction change, the housing is prevented again from pivoting, thereby preventing a further direction change of the windmill blade.

In accordance with the sensing operation of the wind direction sensing means 33, the direction of the windmill blade 10 is adjusted to correspond to the direction of the wind. In addition, the Ha of each blade body 1 receiving the pressure of the wind is adjusted in accordance with the sensing signal from the wind force sensing means 31.

The wind force sensing means 31 has a similar structure as the wind direction sensing means 33. This wind force sensing means 31 is arranged on the upper: surface of the first cam plate 39 at one side of the first cam plate 39. That is, the wind force sensing means 31 includes a wind pressure receiving plate 59, and a second cam plate 63 attached to the middle portion of a shaft 61 carrying the wind pressure receiving plate 59 so that it is rotated along with the shaft 61. A second limit switch 65, which generates an electrical signal, is arranged at a desired portion of the periphery of the second cam plate 63. The shaft 61 extends vertically from the first cam plate 39. The wind pressure receiving plate 59 is connected to another shaft 67 mounted to the first cam plate 39 by an elastic member 69. By this arrangement, the shaft 61 and second cam plate 63 connected to each other by the elastic member 69 are rotated in accordance with a variation in the force of the wind applied to the wind pressure receiving plate 59.

The second cam plate 63 and second limit switch 65 are operationally connected such that when the second limit switch 65 cones into contact with protruded cams 63a, 63b, and 63c of the second cam plate 63 in a sequential fashion, it selectively generates switching signals in a sequential fashion.

Each switching signal from the second limit switch 65 controls a solenoid valve 66 connected to the second limit switch 65, thereby controlling the compressed air supplied to the cylinder 29, and the compressed air discharged from the cylinder 29. The solenoid valve 66, which is connected to an external compressed air source, is configured to operate in accordance with each switching signal from the second limit switch 65. In order to receive the compressed air passing through the solenoid valve 66 to the cylinder 29, and to discharge the compressed air, the cylinder 29 is connected to the external compressed air source via an air joint 71 forming a seal structure with the rotating shaft 130.

When the force of wind applied to the wind pressure adjusting plates 7 is gradually strengthened or weakened, the second limit switch 65 continuously generates switching signals. As a result, the solenoid valve 66 is continuously controlled so that the supply and discharge of compressed air is continuously controlled.

The controlled compressed air serves to drive the winches 19 connected to the rack gear 27 via the pinion 25 as it is supplied to the cylinder 29 or discharged from the cylinder 29. As a result, the wires 11 are wound or unwound Accordingly the wind pressure adjusting plates 7 connected to each wire 11 are operated, thereby adjusting the opening degree of the wind pressure adjusting hole 5 associated with each wind pressure adjusting plate 7. Accordingly, the wind pressure receiving area of each blade body 1 is adjusted. That is, when each wind pressure adjusting hole 5 is closed, the wind pressure receiving area of the blade body 1 is increased. In this case, the windmill blade can be smoothly rotated even by weak force of wind, On the other hand, when each wind pressure adjusting hole 5 is opened, the wind pressure receiving area of the blade body 1 is decreased. In this case, the windmill blade including the blade body 1 can be prevented from being damaged by strong force of wind.

Figure 8:
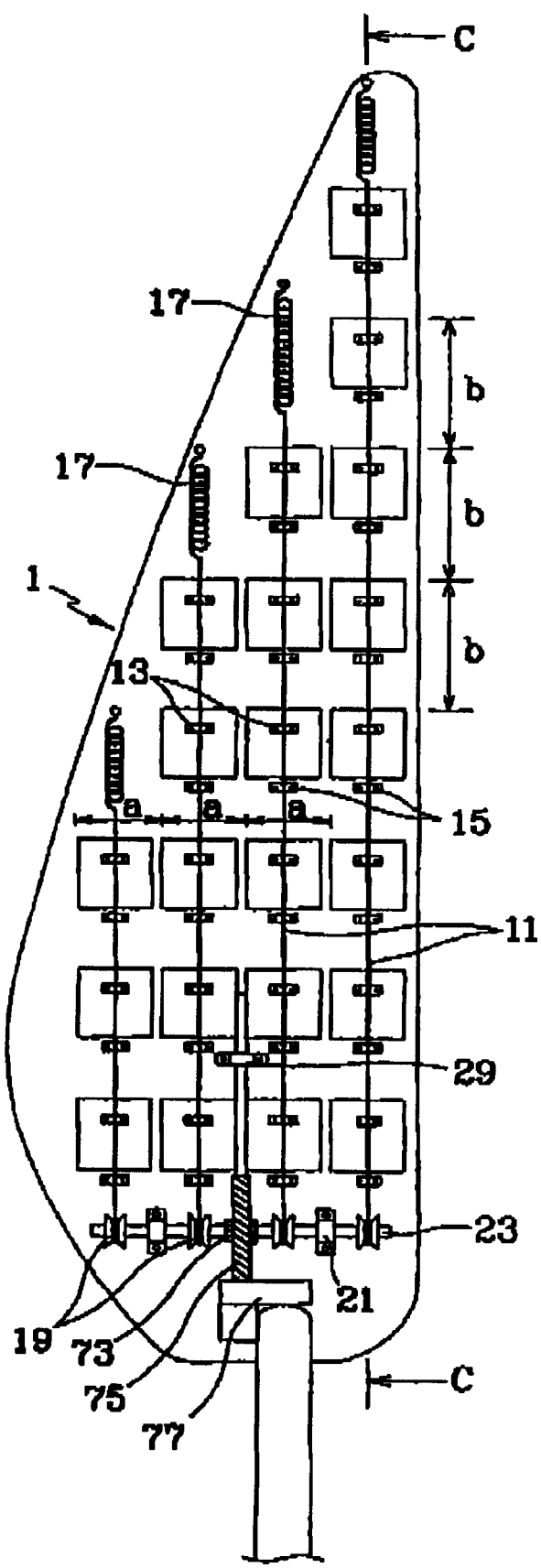
FIG. 8 is a front view illustrating another example of the windmill blade according to the present invention.
Figure 9:
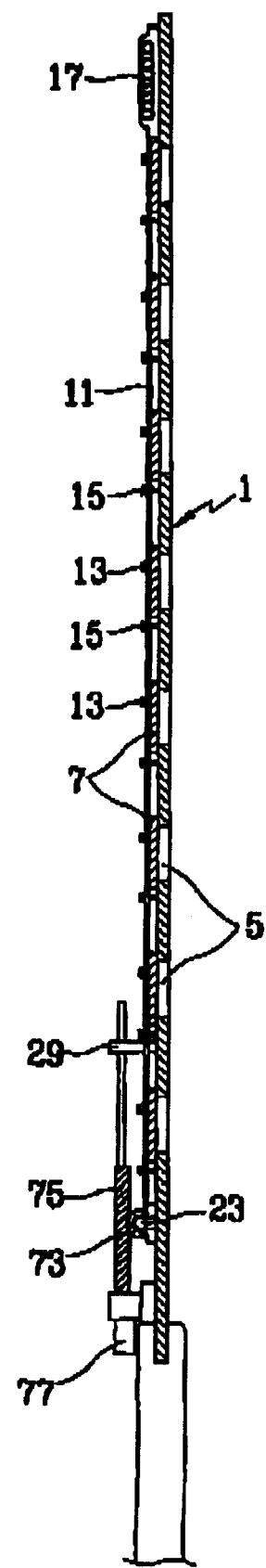
FIG. 9 is a cross-sectional view taken along the line C—C of FIG. 8.

Meanwhile, FIG. 8 is a front view illustrating another example of the windmill blade according to the present invention. FIG. 9 is a cross-sectional view taken along the line C—C of FIG. 8. The configuration and function of this windmill blade are identical or similar to those of the windmill blade shown in FIGS. 1 and 2. Accordingly, this windmill blade will be describe only in terms of its parts which differ from those of FIGS. 1 and 2 while being compared with that of FIGS. 1 and 2, without any description of the same parts existing in FIGS. 1 and 2.

In the windmill blade of FIGS. 1 and 2, its driving means comprises the pinion gear 25, rack gear 27, and cylinder 29. On the other hand, the driving means in the windmill blade of FIGS. 8 and 9 comprises a worn 73 mated to the shaft 23 carrying the winches 19, a worm gear 75 engaged with the worm 73, and a reduction motor 77 connected to the worm gear 75.

In the windmill blade of FIGS. 1 and 2, the rack gear 27 is engaged with the pinion gear 25 mounted to the shaft 23 carrying the winches 19. As the forward and backward movements of the rack gear 27 are controlled in accordance with the extension and retraction of the cylinder 29, each wind pressure adjusting plate 7 is controlled to adjust the opening or closing area of the associated wind pressure adjusting hole 5. On the other hand, in the windmill of FIGS. 8 and 9, the worm gear 75 is engaged with the worm 73 mounted to the shaft 23 carrying the winches 19, As the worm gear 75 is controlled in accordance with rotation of the reduction motor 77, each wind pressure adjusting plate 7 is controlled to adjust the opening or closing area of the associated wind pressure adjusting hole 5.

Figure 10:
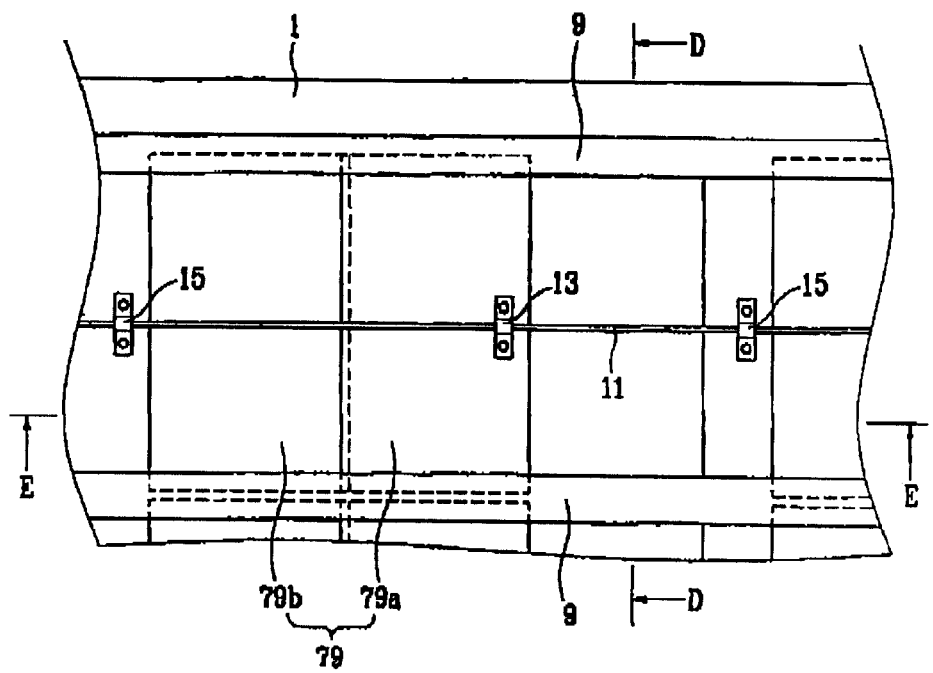
FIG. 10 is a plan view illustrating another example of the wind pressure adjusting plate according to the present invention.
Figure 11:
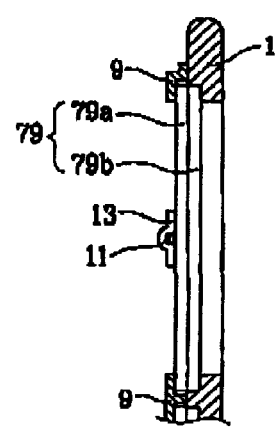
FIG. 11 is a cross-sectional view taken along the line D—D of FIG. 10, illustrating the wind pressure adjusting plate.
Figure 12:
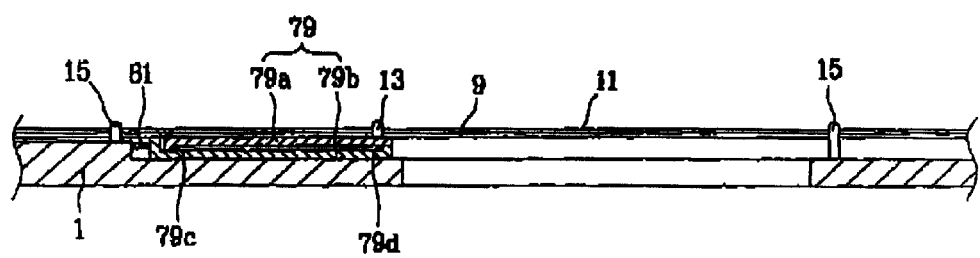
FIG. 12 is a cross-sectional views taken along the line E—E of FIG. 10, illustrating a completely opened state of the wind pressure adjusting plate.
Figure 13:
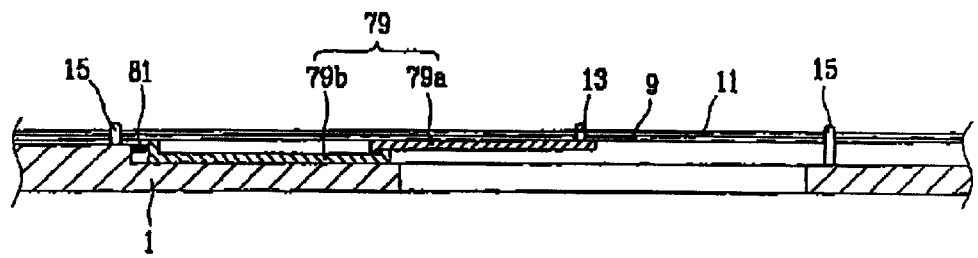
FIG. 13 is a cross-sectional views taken along the line E—E of FIG. 10, illustrating a primary closing stage of the wind pressure adjusting plate.
Figure 14:
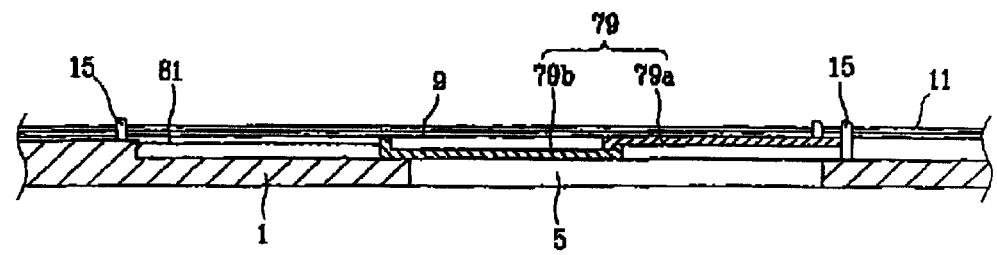
FIG. 14 is a cross-sectional views taken along the line E—E of FIG. 10, illustrating a secondary closing stage of the wind pressure adjusting plate.

Meanwhile, FIG. 10 is a front view illustrating another example of the windmill blade according to the present invention. FIG. 11 is a cross-sectional view taken along the line D—D of FIG. 10. FIGS. 12, 13, and 14 are cross-sectional views taken along the line E—E of FIG. 10, respectively. FIG. 12 shows the completely opened state of each wind pressure adjusting plate, whereas FIGS. 13 and 14 show primary and secondary closing stages of each wind pressure adjusting plate in the case of FIG. 10, respectively. The configuration and function of this windmill blade are identical or similar to those of the windmill blade ho in FIGS. 1 and 2. Accordingly, this windmill blade will be described only in terms of its parts which differ from those of FIGS. 1 and 2 while being compared with that of FIGS. 1 and 2, without any is description of the same parts existing in FIGS. 1 and 2.

In the windmill blade of FIGS. 1 and 2, a plurality of wind pressure adjusting plates 7 are connected to the same wire 11 so that they are simultaneously operated to open or close the associated wind pressure adjusting holes 5. On the other hand, in the windmill blade of FIGS. 10 to 14, each wind pressure adjusting plate, which is denoted by the reference numeral 79, includes upper and lower wind pressure adjusting plates 79a and 79b configured to be sequentially slidable, thereby sequentially opening or closing the associated wind pressure adjusting hole 5 through two stages. That is, the lower wind pressure adjusting plate 79b is connected to the blade body 1 by an elastic member 81. The upper and lower wind pressure adjusting plates 79a and 79b are connected to each other by engagement jaws 79c and 79d. The upper wind pressure adjusting plate 79b is connected at one end thereof to one wire 11.

Figure 15:
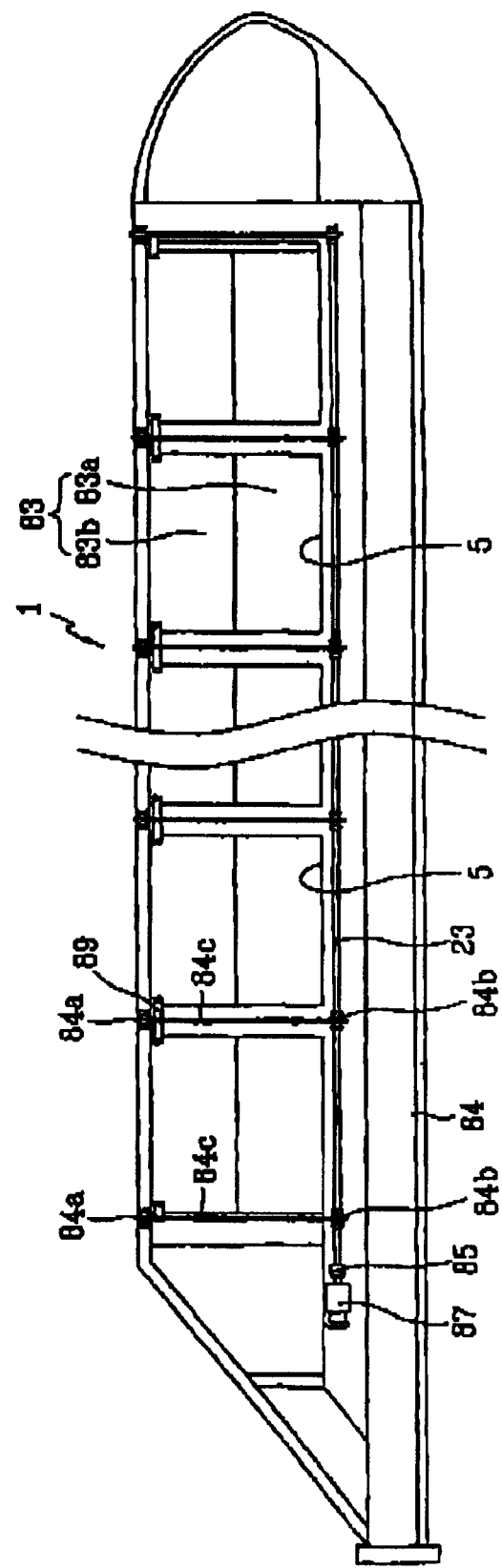
FIG. 15 is a front view illustrating another example of the windmill blade according to the present invention.
Figure 16:
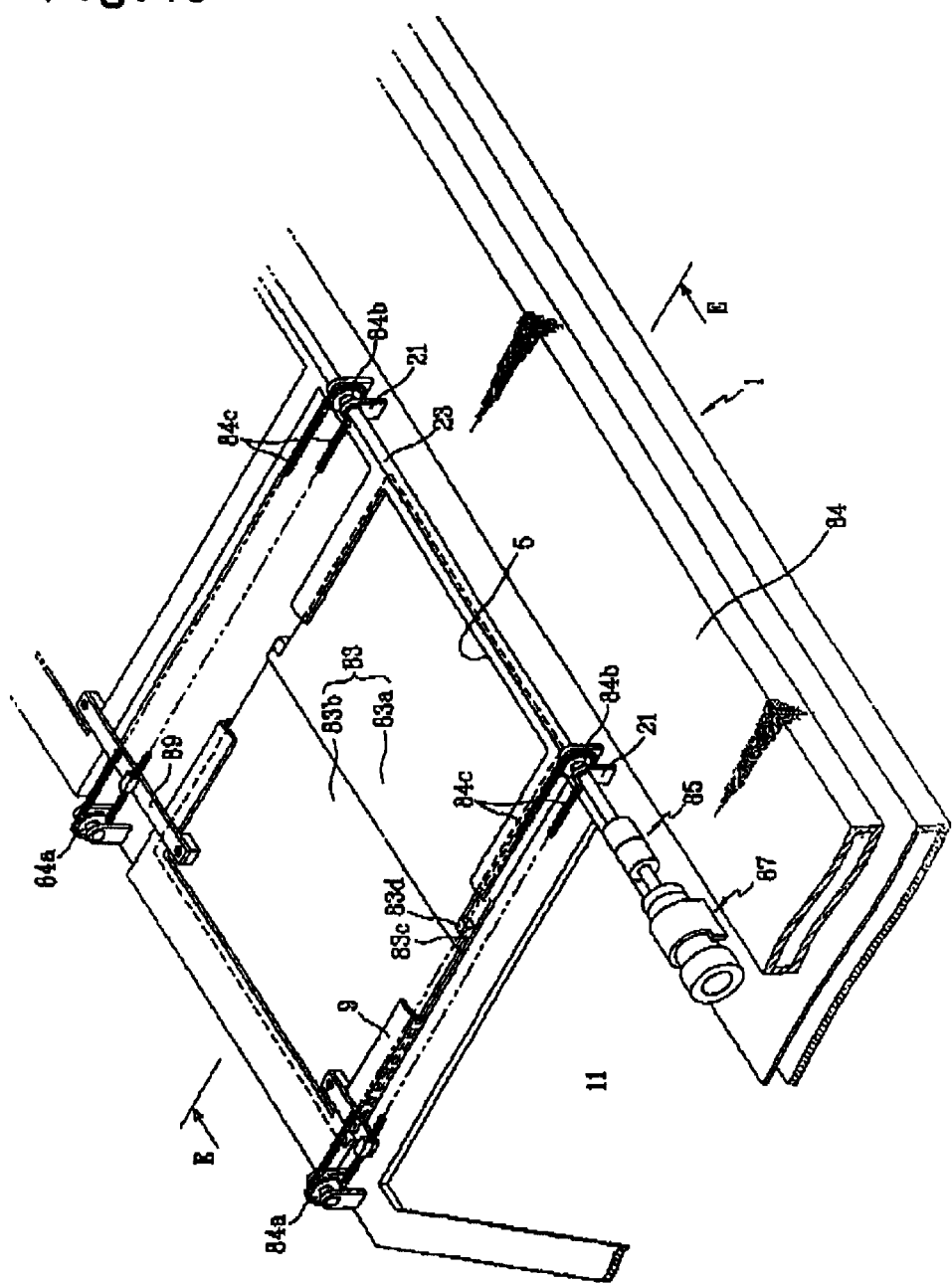
FIG. 16 is a partially-broken perspective view illustrating a wind pressure adjusting plate shown in FIG. 15.
Figure 17:
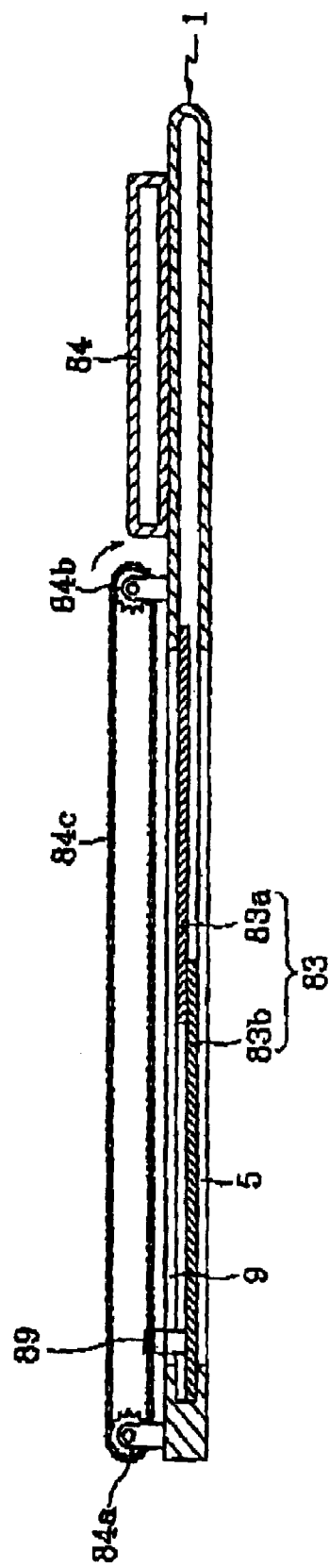
FIG. 17 is a cross-sectional views taken along the line E—E of FIG. 16, illustrating a completely closed state of the wind pressure adjusting plate.
Figure 18:
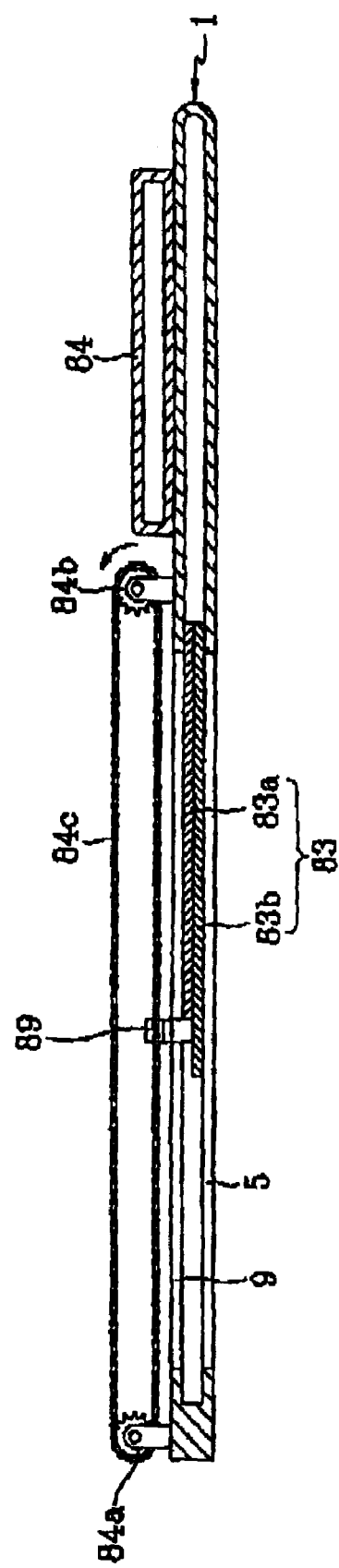
FIG. 18 is a cross-sectional views taken along the line E—E of FIG. 16, illustrating a primary opening stage of the wind pressure adjusting plate.
Figure 19:
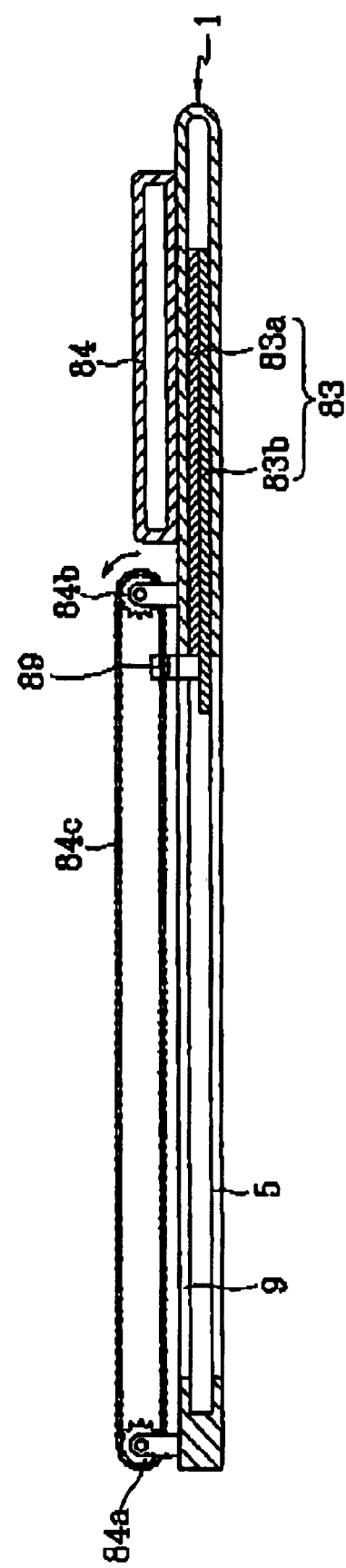
FIG. 19 is a cross-sectional views taken along the line E—E of FIG. 16, illustrating a secondary opening stage of the wind pressure adjusting plate.

FIG. 15 is a front view illustrating another example of the windmill blade according to the present invention. FIG. 16 is a partially-broken perspective view illustrating a wind pressure adjusting plate shown in FIG. 16. FIG. 17 shows a completely closed state of the wind pressure plate, FIG. 18 shows a primary opening stage of the wind pressure adjusting plate, and FIG. 19 shows a secondary opening stage of the wind pressure adjusting plate. The configuration and function of this windmill blade are identical or similar to those of each embodiment as described above. Accordingly, this windmill blade will be described only in terms of its parts which differ frown that of each embodiment as described above while being compared with that of the above described embodiment, without any description of the same parts existing in the above described embodiment.

In the case of the blade body 1 shown in FIGS. 1 and 2 or FIGS. 8 to 14, the wind pressure adjusting holes 5 are arranged in rows in a longitudinal direction of the blade body 1. The wind pressure adjusting plates 7 or 79 respectively associated with the wind pressure adjusting holes 5 are longitudinally slidable to open or close the associated wind pressure adjusting holes 5. In accordance with this arrangement, a reduced number of winches 19 are used. In this case, the length of the shaft 23 is reduced, whereas the length of each wire 11 is increased, On the other hand, in the case of the blade body 1 shown in FIGS. 15 to 19, the wind pressure adjusting holes 5 are arranged in a lateral direction of the blade body 1. Wind pressure adjusting plates 83 respectively associated with the wind pressure adjusting holes 5 are laterally slidable to open or close the associated wind pressure adjusting holes 5. As shown in FIG. 16, the means for driving the wind pressure adjusting plates 83 comprises pairs of sprockets respectively associated with he wind pressure adjusting plates 83. Each sprocket pair includes first and second sprockets 84a and 84b arranged at opposite sides of the associated wind pressure adjusting plate 83, and connected to each other by a chain 84c. The first sprocket 84a is rotatably mounted to the blade body 1, whereas the second sprocket 84b is fixedly mounted to the shaft 23 supported by shaft support members 21. The driving means also includes a reduction motor 87 directly coupled to the shaft 23 by a coupling mentor 85. In accordance with this arrangement, the driving means has a simplified configuration. In accordance with the arrangement of FIGS. 15 to 19, increased numbers of the first and second sprockets 84a and 84b are used, as compared to the case of FIGS. 1 and 2 or FIGS. 8 to 14. Also, the length of the shaft 23 is increased, whereas the length of each chain 84c is reduced. In accordance with this arrangement, it is possible to provide an increased freedom of design selection upon deigning windmill blades. A longitudinally-extending reinforcing member 84 may be attached to the blade body 1 in order to provide a high breaking resistance to wind force.

Each wind pressure adjusting plate 83 includes upper and lower wend pressure adjusting plates 83a and 83b configured to be sequentially slidable, in lateral directions, along guides 9 mounted to the blade body 1, thereby sequentially opening or closing the associated wind pressure adjusting hole 5 through two stages. The upper and lower wind pressure adjusting plates 83*a* and 83*b* are connected to each other by engagement jaws 83*c* and 83*d*. The lower wind pressure adjusting plate 83*b* is connected, at an and thereof opposite to its engagement jaw 83*d,* to the associated chain 84*c* adapted to run around the associated first sprocket 84*a,* by a plate 89. Each chain 84*c,* which forms a loop, is engaged with the associated first sprocket 84*a* at one side thereof, so that it is connected to one side of the blade body 2. The chain 84*c* is also engaged with the associated second sprocket 84*b* at the other side thereof, so that it is connected to the other side of the blade body 1.

Accordingly, when a drive force is applied to the chain 84*c* in accordance with a clockwise rotation of the reduction motor 7, the chain 84*c* moves the lower wind pressure adjusting plate 83*b* toward the first sprocket 84*a* via the plate 89, In accordance with a continued movement of the lower wind pressure adjusting plate 83*b,* the engagement jaw 83*d* of the lower wind pressure adjusting plate 83*b* is engaged with the engagement jaw 83*c* of the upper wind pressure adjusting plate 83*a,* so that the upper wind pressure adjusting plate 83*a* is connected to the lower wind pressure adjusting plate 83*b.* A further movement of the chain 84*c* in this state causes the upper wind pressure adjusting plate 83*a* to move toward the first sprocket 84*a* along with the lower wind pressure adjusting plate 83*b.* As a result, the associated wind pressure adjusting hole 5 is completely closed.

When an opposite drive force is applied to the chain 84*c* in accordance with a counter-clockwise rotation of the reduction rotor 87 in the closed state of the wind pressure adjusting hole 5, the chain 84*c* moves the lower wind pressure adjusting plate 83*b* toward the second sprocket 84*b* via the plate 89. In accordance with a continued movement of the lower wind pressure adjusting plate 83*b,* the plate 89 comes into contact with the end of the upper wind pressure adjusting plate 83*a* facing the plate 89.

Figure 20:
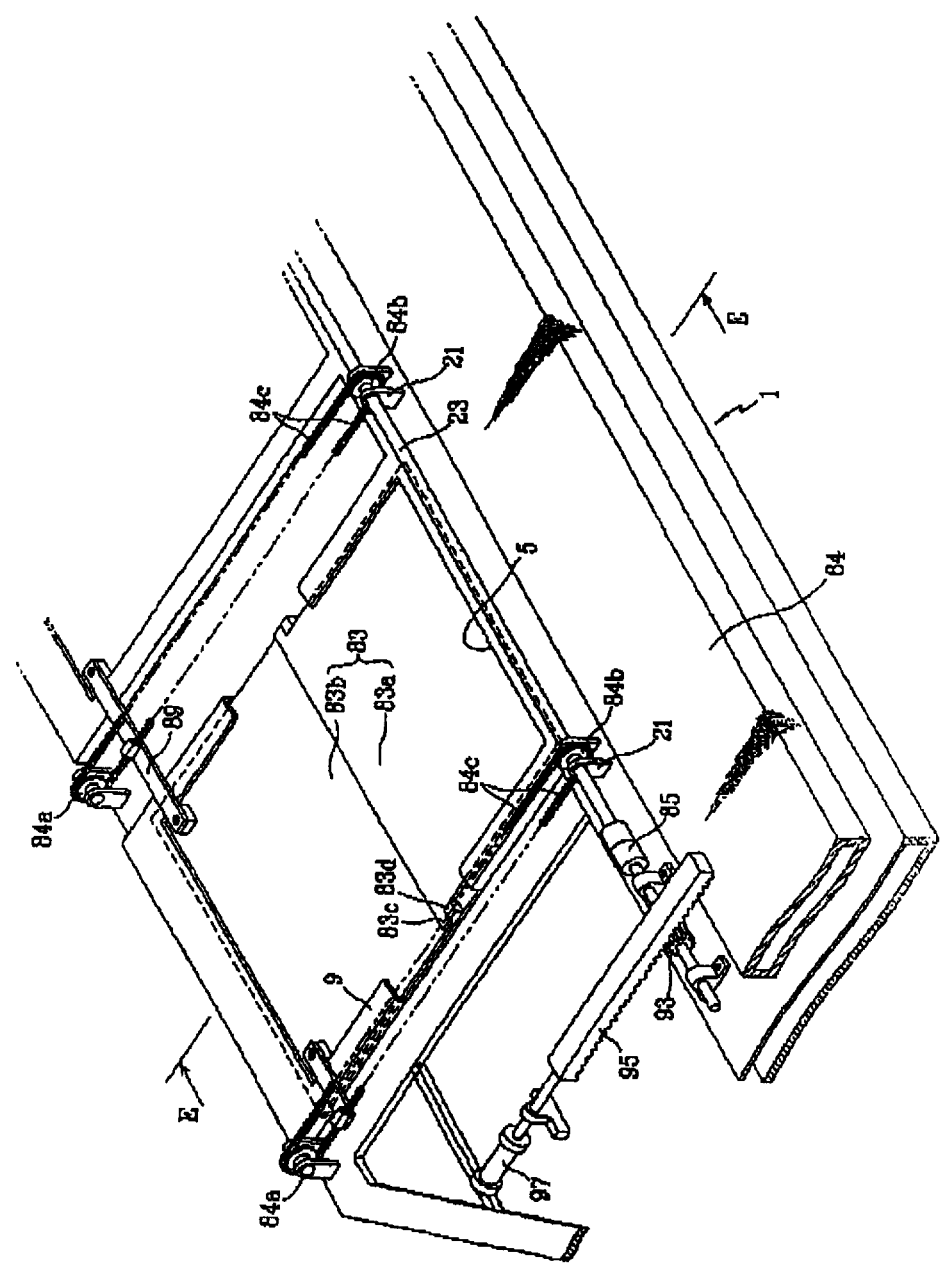
FIG. 20 is a partially-broken perspective view illustrating a wind pressure adjusting plate shown in FIG. 15.

When the opposite drive force is further applied to the chain 84*c* in accordance with a further counter-clockwise rotation of the reduction motor 87 in this state, the lower wind pressure adjusting plate 83*b* is further moved toward the second sprocket 84*b* by the plate 89. At this time, the plate 89 connected to the lower wind pressure adjusting plate 83*b* pushes the facing end of the upper wind pressure adjusting plate 83*a,* thereby causing the wind pressure adjusting hole 5 to be completely opened, FIG. 20 is a partially-broken perspective view illustrating another example of the wind pressure adjusting plate shown in FIG. 15. The configuration and function of this wind pressure adjusting plate is identical or similar to that of FIGS. 15 and 16. Accordingly, this wind pressure adjusting plate will be described only in terms of its parts which differ from those of FIGS. 15 and 16 while being compared with that of FIGS. 15 and 16, without any description of the same parts existing in FIGS. 15 and 16.

As described above, the driving means of FIGS. 15 and 16 comprises the reduction motor 87 directly coupled to the shaft 23 by the coupling member 85. On the other hand, the driving means shown in FIG. 20 comprises a pinion gear 93 coupled to the shaft 23 by the coupling member 85, a rack gear 95 engaged with the pinion gear 93, and a cylinder 97 connected to the rack gear 95.

Figure 21:
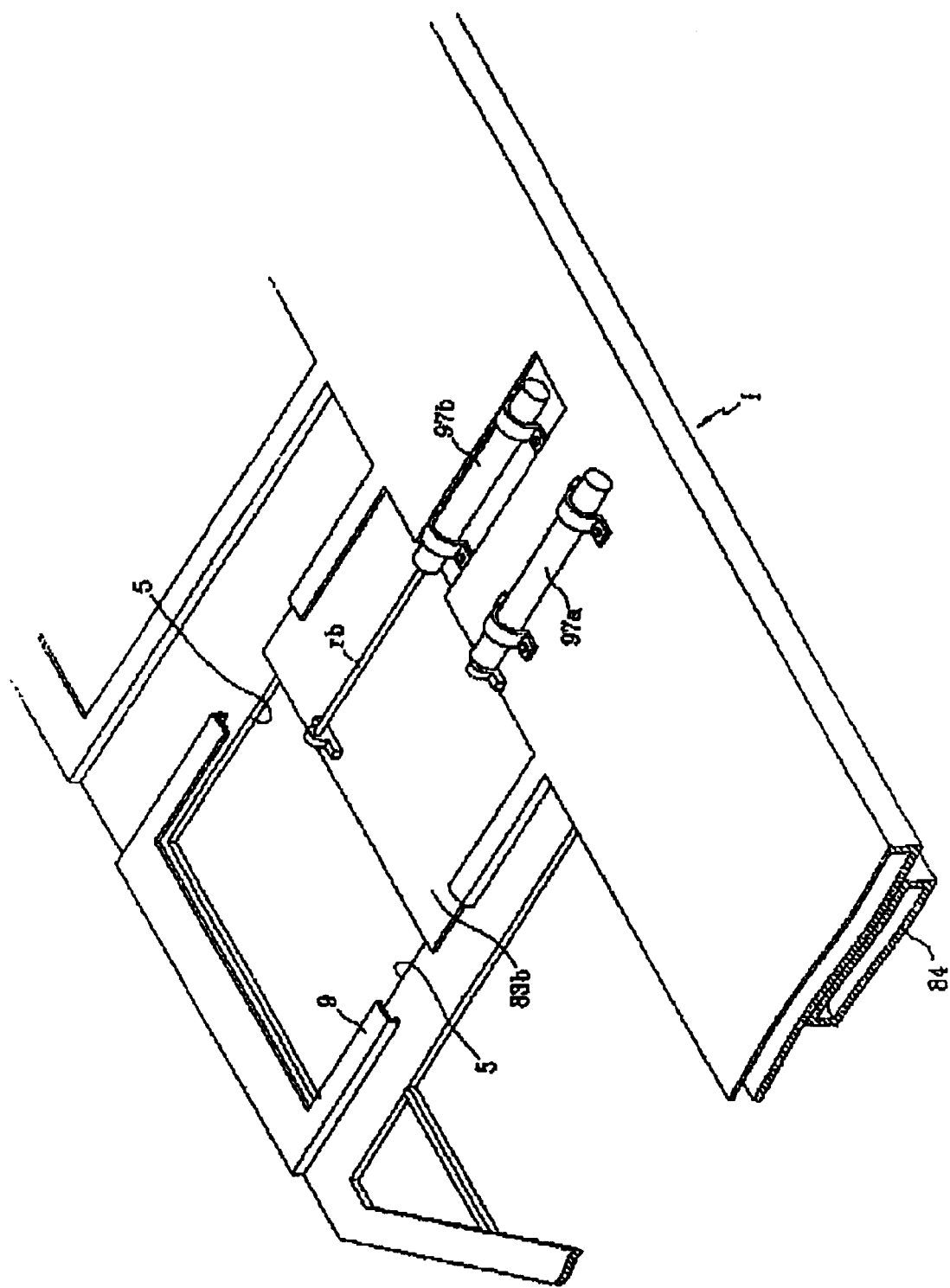
FIG. 21 is a partially-broken perspective view illustrating a wind pressure adjusting plate shown in FIG. 15.
Figure 22:
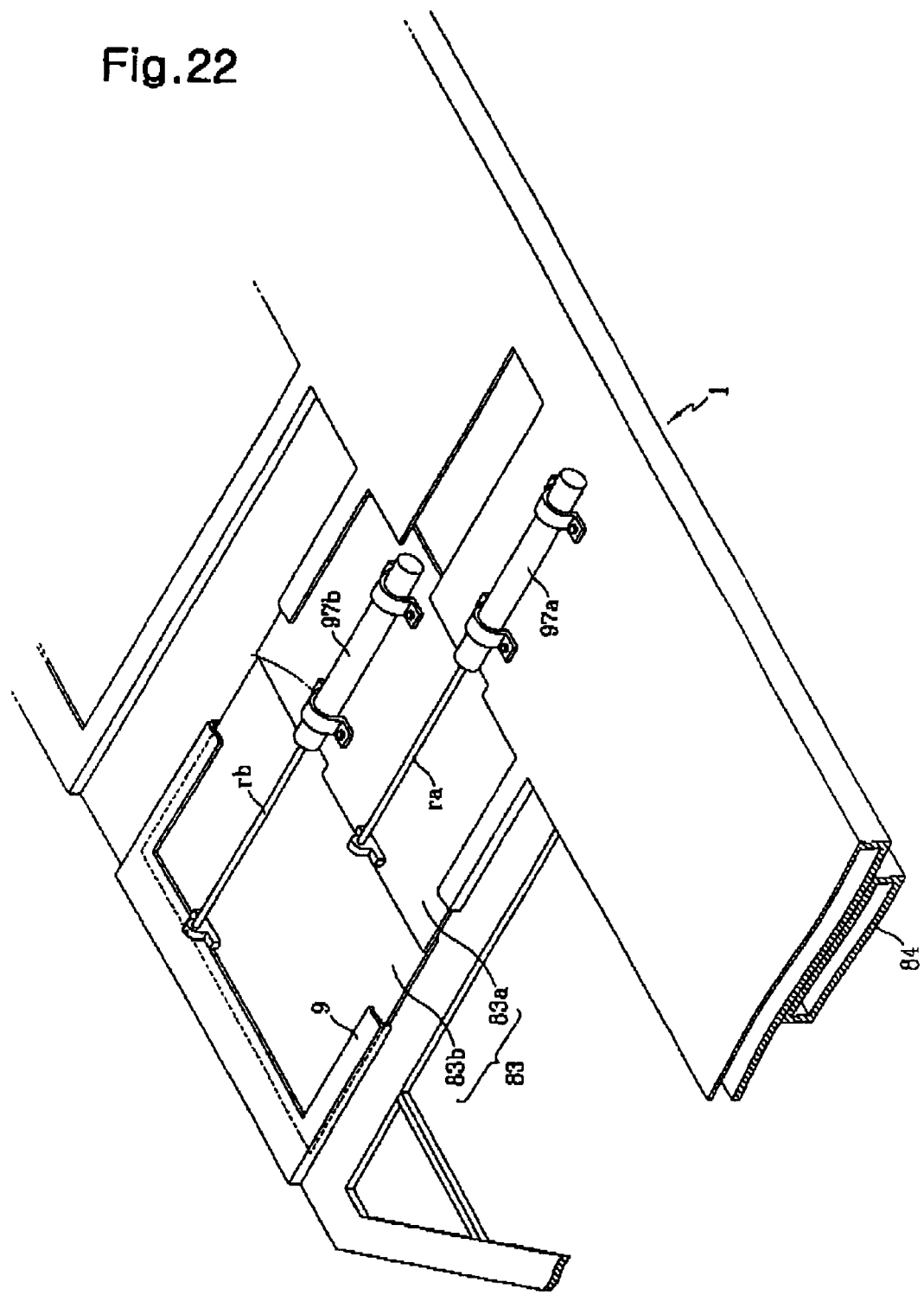
FIG. 22 is a partially-broken perspective view illustrating a wind pressure adjusting plate shown in FIG. 15.

FIGS. 21 and 22 illustrate another example of the wind pressure adjusting plate shown in FIG. 15. FIG. 21 shows a completely closed state of the wind pressure adjusting hole 5, whereas FIG. 22 shows a state of the wind pressure adjusting hole 5 opened at a primary opening stage.

As described above, the driving means of FIGS. 15 and 16 comprises the reduction motor 67 adapted to drive each chain 84*c* connected to the shaft 23, thereby indirectly opening or closing the upper and lower wind pressure adjusting plates 83*a* and 83*b*. on the other hand, the driving mean of FIGS. 21 and 22 comprises first and second cylinders 97*a* and 97*b* in order to directly open or close the upper and lower wind pressure adjusting plates 83*a* and 63*b*.

The first and second cylinders 97*a* ad 97*b* are configured to extend or retract by hydraulic or pneumatic pressure. The upper and lower wind pressure adjusting plates 83*a* and 83*b* are directly connected to respective rods ra and rb of the first and second cylinders 97*a* and 97*b* so as to open or close the associated wind pressure adjusting hole 5.

The first cylinder 97*a* is mounted to the blade body 1, and its rod ra is ted to the upper wind pressure adjusting plate 83*a*. The second cylinder 97*b* is mounted to the upper wind pressure adjusting plate 83*a,* and its rod rb is mounted to the lower wind pressure adjusting plate 83*b,* Accordingly, the second cylinder 97*b* is moved along with the upper wind pressure adjusting plate 83*a* in accordance with an extension or retraction operation of the first cylinder 97*a*.

FIG. 21 shows the state in which the upper and lower wind pressure adjusting plates 83*a* and 83*b* completely close the wind pressure adjusting hole 5 in accordance with the extension operations of the first and second cylinders 97*a* and 97*b*. FIG. 22 shows the state in which the rod of the first cylinder 97*a* is retracted, so that the upper wind pressure adjusting plate 83*a* is moved to open the wind pressure adjusting hole 5 at a primary opting stage.

When a control operation is carried out to retract the rod of the first cylinder 97*a* while maintaining the rod of the second cylinder 97*b* in its extended state, it is possible to maintain the wind pressure control hole 5 at a primary closed stage by the lower wind pressure adjusting plate 83*a*. Alternatively, the wind pressure control hole 5 can be maintained at the primary closed stage by both the upper and lower wind pressure adjusting plates 83*a* and 83*b* by controlling the second cylinder 97*b* to retract its rod while maintaining the rod of the first cylinder 97*a* to be at its extended state.

When the second cylinder 97*b* is operated to retrace its rod from the state of FIG. 21, the lower wind pressure adjusting plate 83*b* is moved to be positioned beneath the upper wind pressure adjusting plate 83*a* moved to open the wind pressure adjusting hole 5, thereby causing the wind pressure adjusting hole 5 to be completely opened without being closed by the upper and lower wind pressure adjusting plates 83*a* and 83*b*.

Figure 23:
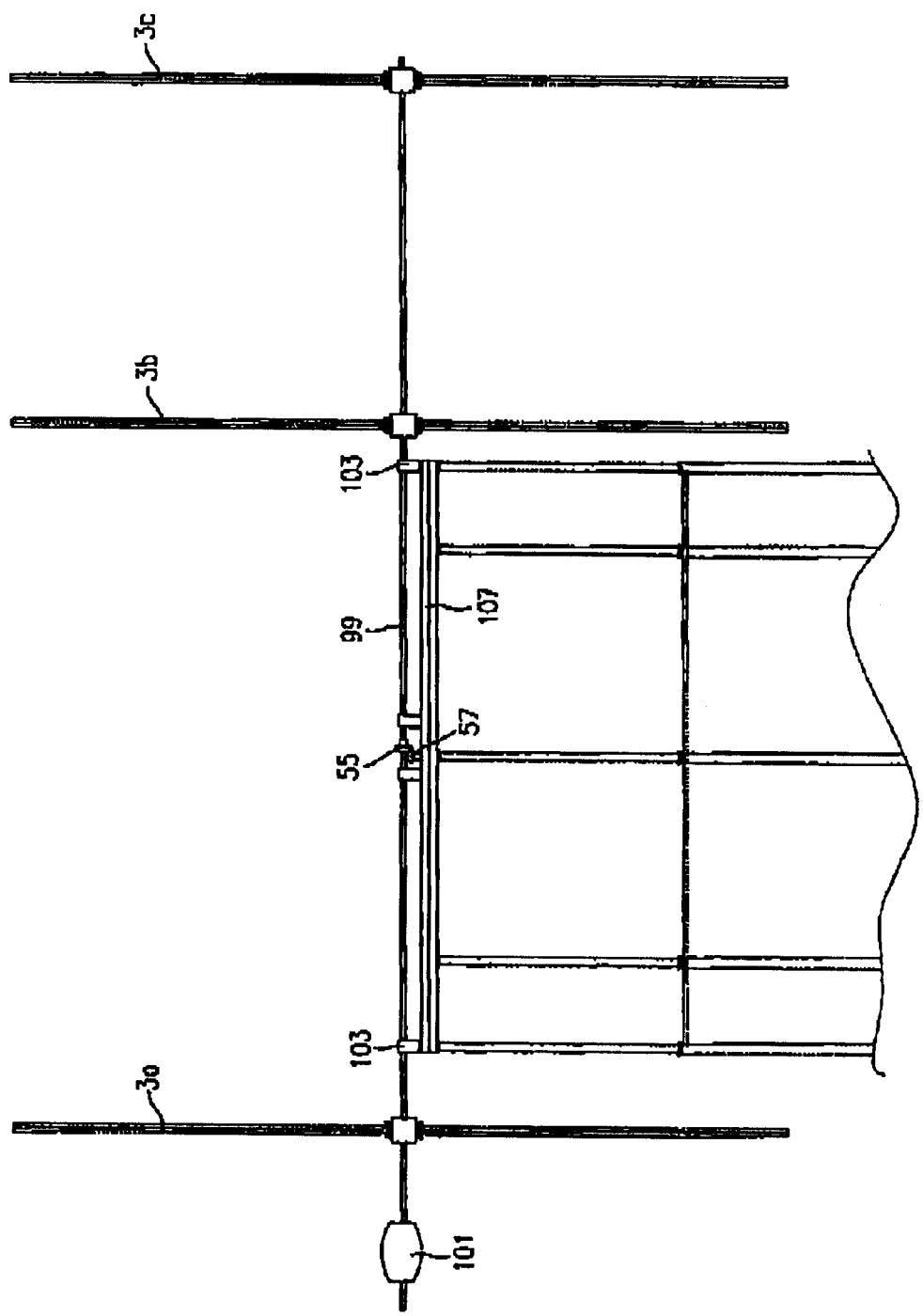
FIG. 23 is a side view illustrating an example of a wind power generating apparatus according to the present invention.
Figure 24:
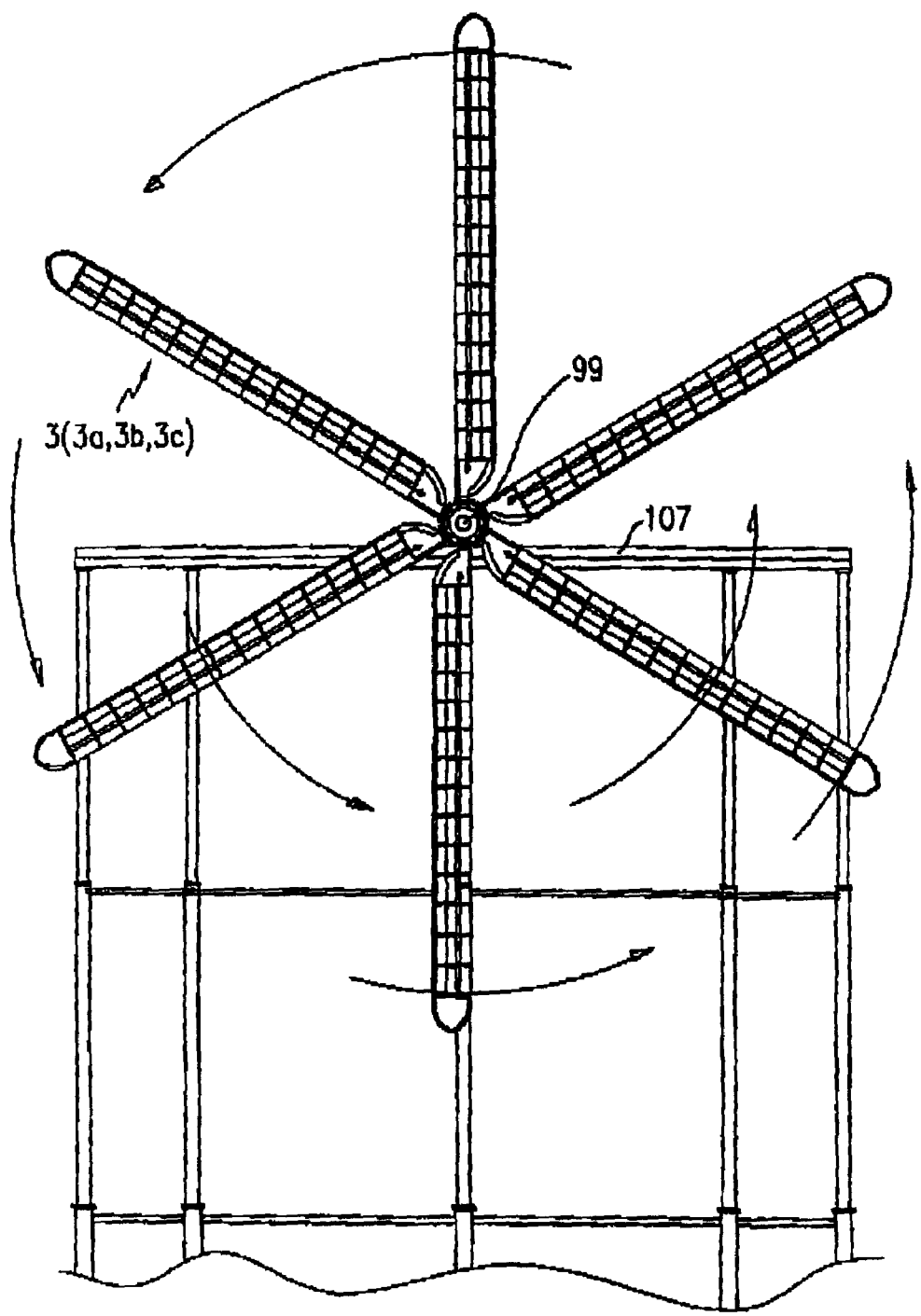
FIG. 24 is a front view illustrating a left portion of the wind power generating apparatus when viewed in FIG. 23.
Figure 25:
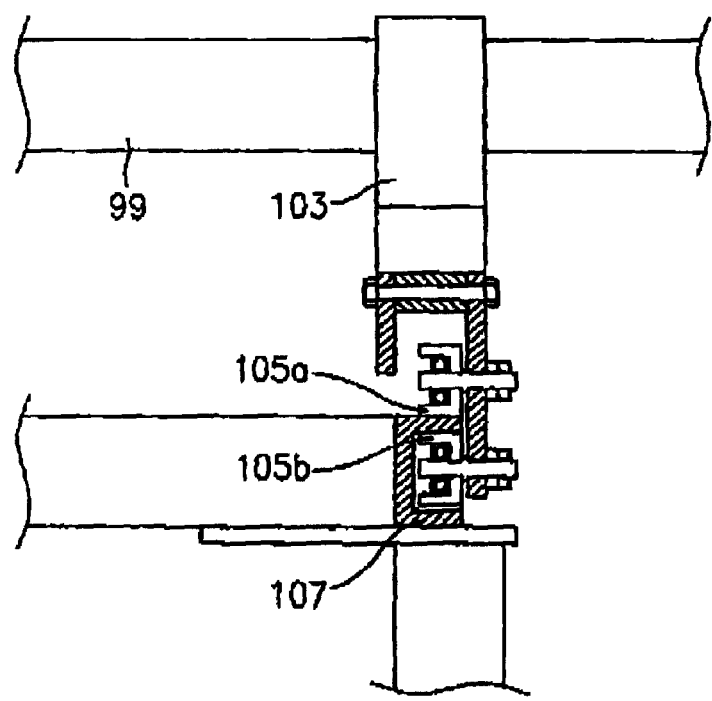
FIG. 25 is a sectional view illustrating a shaft support member shown in FIG. 23.

Meanwhile, FIG. 23 is a side view illustrating a wind power generating apparatus to which the windmill blade of FIGS. 15 to 22 according to the present invention is applied. FIG. 24 is a front view illustrating a left portion of the wind power generating apparatus when viewed in FIG. 23. Referring to FIG. 24, it can be seen that three blade assemblies 3*a,* 3*b,* and 3*c* are mounted to the same shaft 99 while being spaced apart from one another along the shaft 99.

Figure 7:
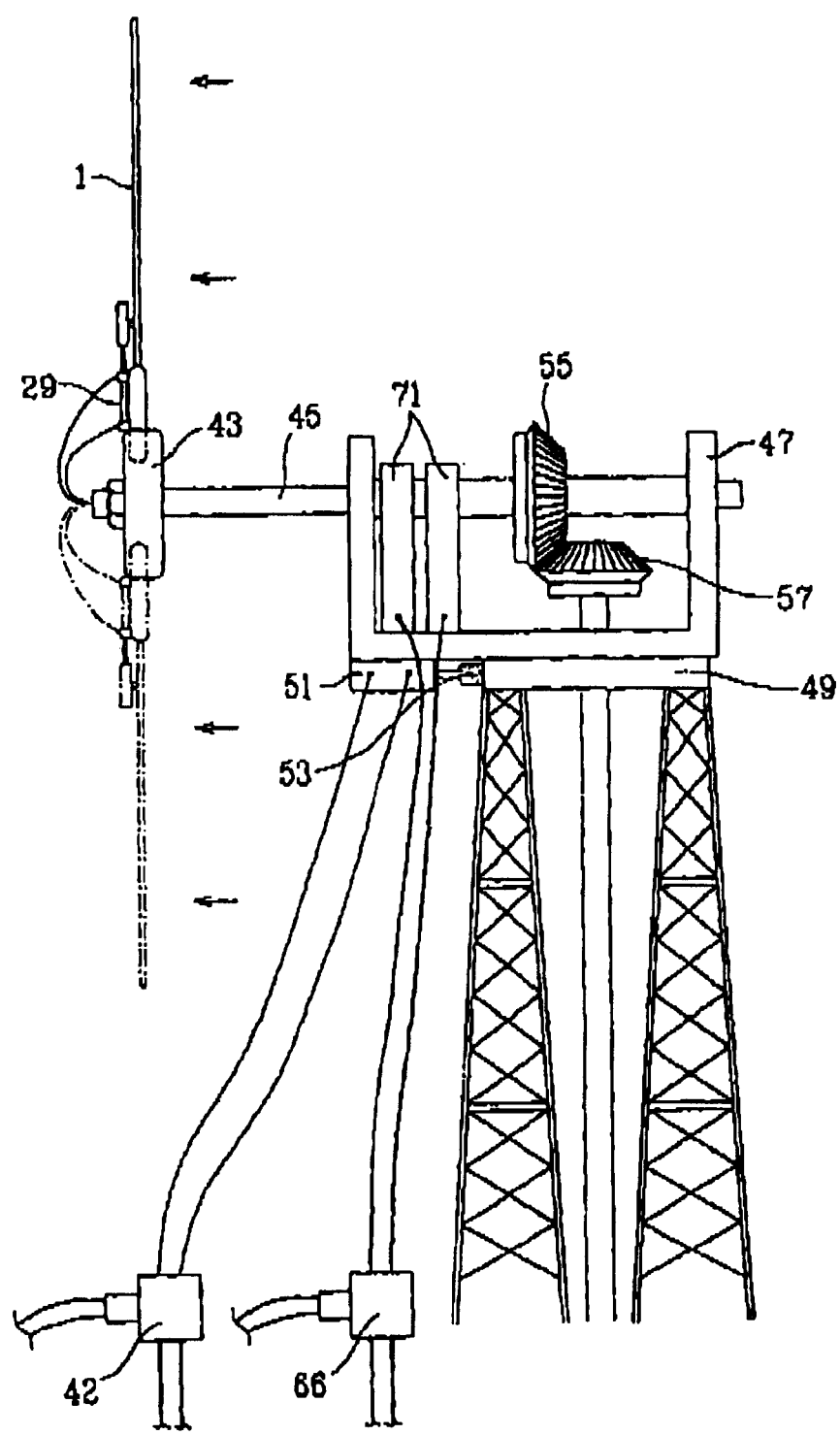
FIG. 7 is a view schematically illustrating the mounted state of the windmill blade according to the present invention.

The entire configuration of the wind power generating apparatus shown in FIGS. 23 and 24 is similar to the wind power generating apparatus of FIG. 7. Accordingly, this wind power generating apparatus will be described only in terms of its parts which differ from that of FIG. 7 while being compared with that of FIG. 7, without any description of the same parts existing in FIG. 7. In the wind power generating apparatus of FIG. 7, a single blade assembly is mounted to the single central shaft 45. In this case, power is generated only by the single blade assembly. On the other hand, the wind power generating apparatus of FIGS. 23 and 24 can obtain an enhanced wind force utilizing efficiency because wind power is generated by rotating forces from the three blade assemblies 3a, 3b, and 3c.

The mounting of the three blade assemblies 3a, 3b, and 3c to the single central shaft 99 is carried out such that two blade assemblies 3b and 3c are arranged at one side of the central shaft 99, and the remaining blade assembly 3a is arranged at the other side of the central shaft 99 along with a balance weight 101, in order to balance the central shaft 99.

In the wind power generating apparatus of FIG. 7, the central shaft 45 is mounted to the housing 47 such that it is pivotable along with the housing 47 in accordance with a variation in wind direction. In accordance with this arrangement, the blade assembly is directed perpendicular to the direction of wind. On the other hand, in the wind power generating apparatus of FIGS. 23 and 24, a shaft support member 103 adapted to support the central shaft 99 is mounted to a rotating rail 107 via bearings 105a and 105b. In accordance with this arrangement, the blade assemblies 3a, 3b, and 3c are pivotable along with the central shaft 99 and shaft support member 103 in accordance with a variation in wind direction so that they are directed perpendicular to the direction of wind.

Figure 26:
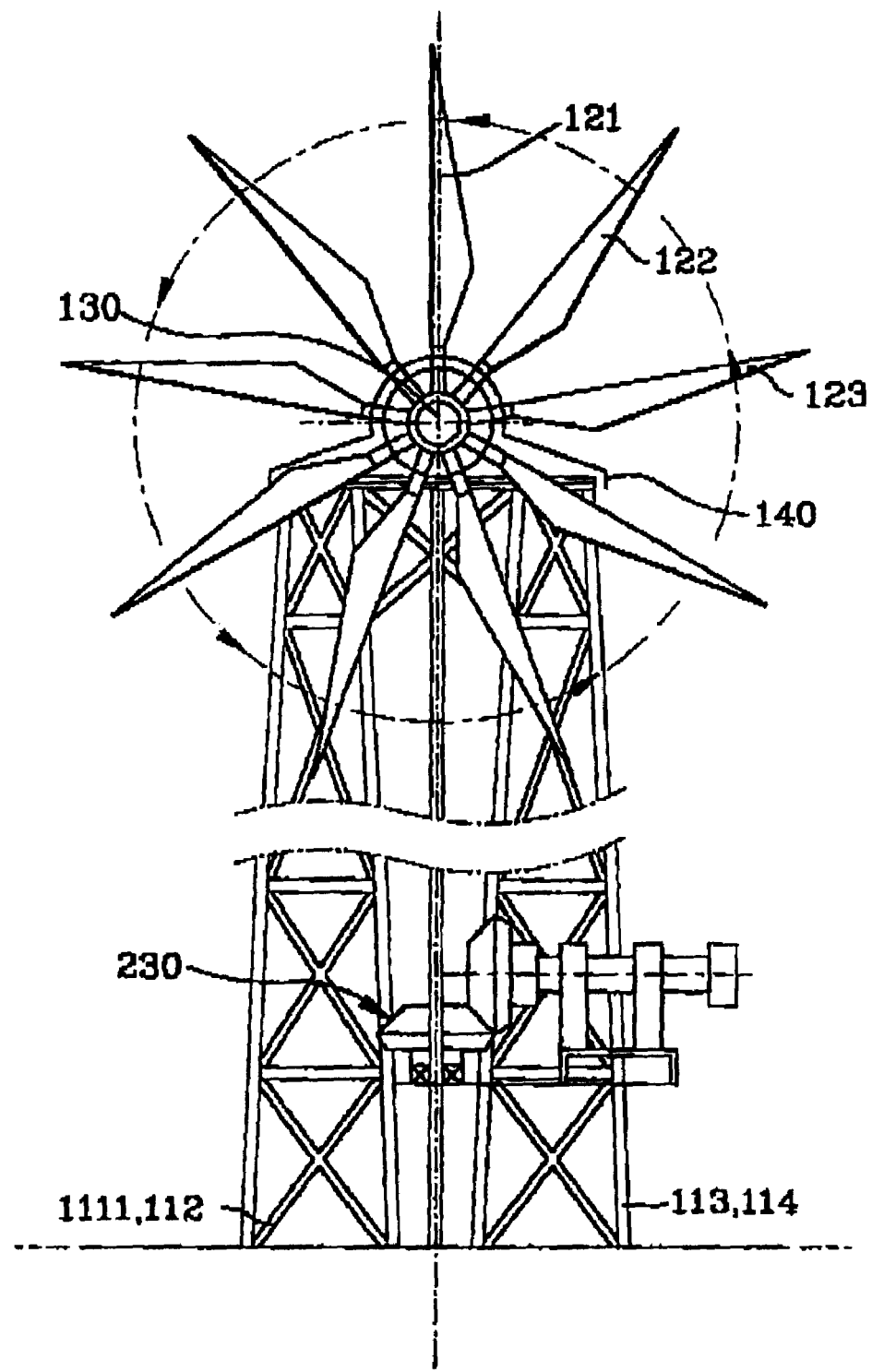
FIG. 26 is a rear view illustrating another example of the wind power generating apparatus according to the present invention.
Figure 27:
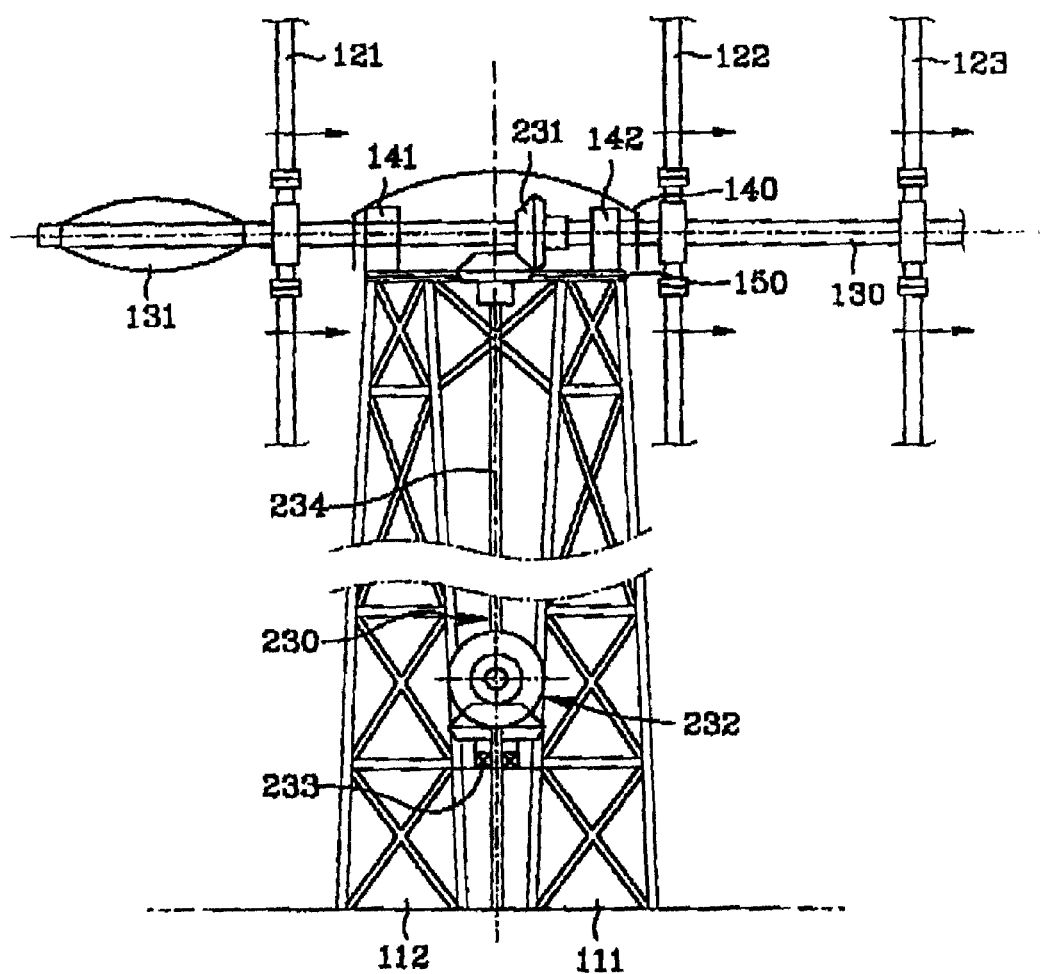
FIG. 27 is a side view illustrating the wind power generating apparatus shown in FIG. 26.
Figure 28:
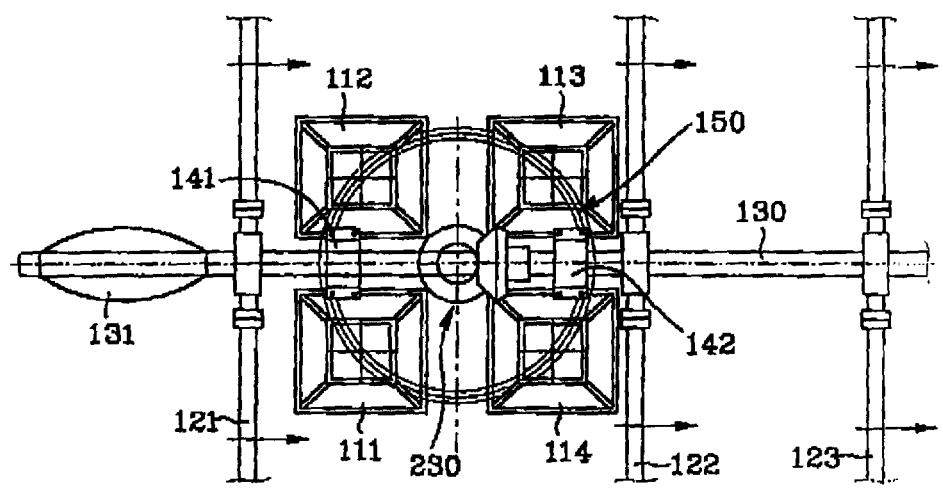
FIG. 28 is a plan view illustrating the wind power generating apparatus shown in FIG. 26.

FIGS. 26 to 28 illustrate another example of the wind power generating apparatus according to the present invention. FIG. 26 is a rear view.

As shown in FIGS. 26 to 28, at least one iron tower is installed on the ground. In he illustrated case, four iron towers 111, 112, 113, and 114 are installed. At least three multi-stage windmill blades are mounted to a rotating shaft 130 on the iron towers 111, 112, 113, and 114. In the illustrated case, primary secondary and third-stage windmill blades 121, 122, and 123 of three stages are provided. The primary, secondary and third-stage windmill blades 121, 122, and 123 are mounted to the same rotating shaft 130 so that they are simultaneously rotated in accordance with rotation of the rotating shaft 130.

Power generated in accordance with rotation of the primary, secondary and third-stage windmill blades 121, 122, and 123 is transmitted to a device adapted to utilize the power via the rotating shaft 130 and a power transmission unit 230 arranged beneath the rotating shaft 130. The reference numeral 140 denotes a cover.

FIG. 27 is a side view illustrating the wind power generating apparatus. As shown in FIG. 27, the primary, secondary, and third-stage windmill blades 121, 122 and 123 are mounted to the rotating shaft 130 on the iron towers 111, 112, 113, and 114. The primary-stage windmill blade 121 is mounted to a front portion of the rotating shaft 120, whereas the secondary and third-stage windmill blades 122 and 123 are mounted to a rear portion of the rotating shaft 120. The weight imbalance of the rotating shaft 130 caused by the primary-stage windmill blade 121 and the secondary and third-stage windmill blades 122 and 123 is eliminated by the balance weight 131 provided at the front portion of the rotating shaft 130.

The primary, secondary, and third-stage windmill blades 121, 122, and 123 are mounted to the rotating shaft 130 while being spaced apart from one another. An enhancement in wind power is obtained by the provision of the primary, secondary, and third-stage windmill blades 121, 122, 123 spaced apart from one another.

The rotating shaft 130 is rotatably mounted on the iron towers 111, 112, 113, and 114 by the first and second bearings 141 and 142. Rotating forces of the primary, secondary, and third-stage windmill blades 121, 122, and 123 are transmitted to the wind power utilizing device via the rotating shaft 130 and power transmission unit 230. The power transmission unit 230 includes a transmission shaft 234 extending downwardly to be perpendicular to the rotating shaft 130, as in conventional cases. The transmission shaft 234 is connected, at its upper end, with the rotating shaft 130 by an upper bevel gear 231. The lower end of the transmission shaft 234 is connected to the wind power utilizing device by a lower bevel gear 232 supported by a support die 233 mounted to the iron towers 111, 112, 113 and 114 so that it can transmit wind power to the wind power utilizing device.

The rotating shaft 230 rotatably supported by the first and second bearings 141 and 142, and the primary, secondary, and third-stage windmill blades 121, 122, and 123 can turn in accordance with a variation in wind direction by the configuration of a turning unit 150 (FIG. 28).

Figure 29:
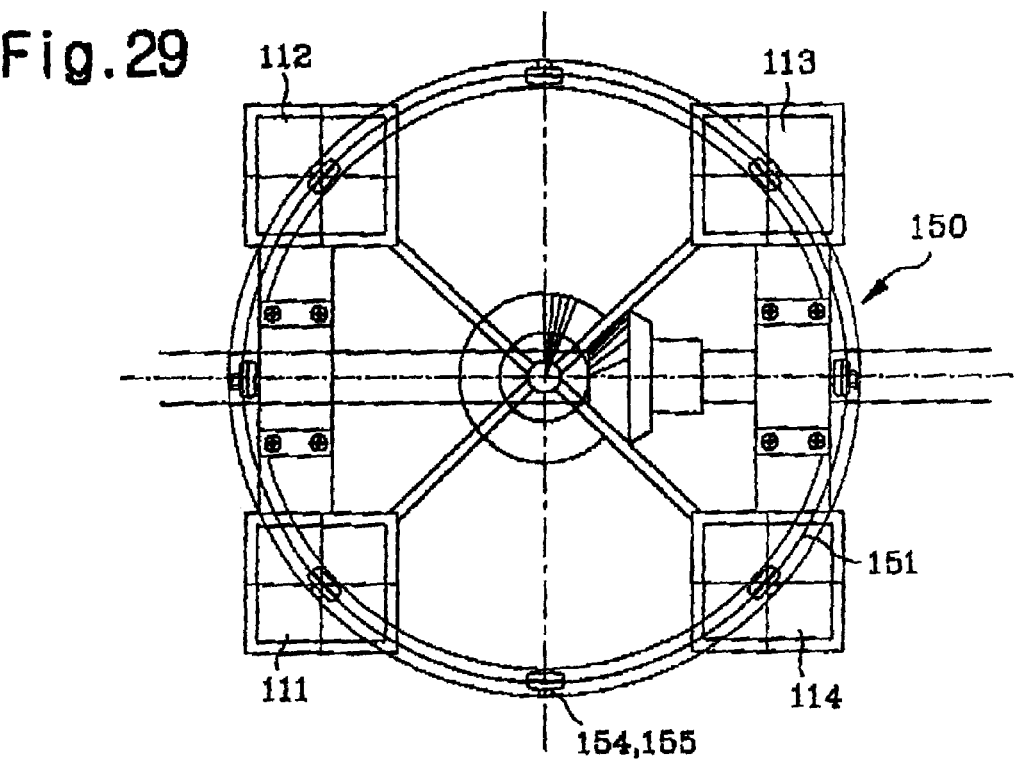
FIG. 29 is a plan view illustrating a turning unit shown in FIG. 28.
Figure 30:
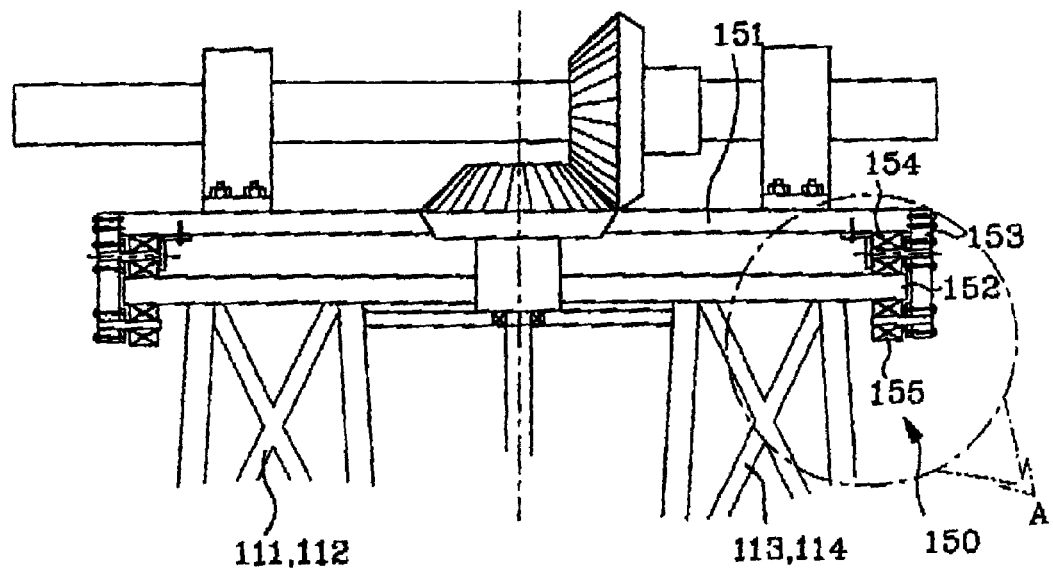
FIG. 30 is a side view illustrating the turning unit shown in FIG. 28.

FIGS. 29 and 30 illustrate the turning unit according to the present invention. FIG. 29 is a plan view, whereas FIG. 30 is a side view. As shown in FIGS. 29 and 30, the turning unit 150 includes a circular rail 153 mounted on at least one iron tower, for example, the four iron towers 111, 112, 113, and 114 in the illustrated case. The turning unit 150 also includes a windmill support die 151 supported by the circular rail 153 while carrying first and second bearings 141 and 142 adapted to rotatable support the rotating shaft 130 carrying the primary, secondary, and third-stage windmill blades 121, 122, and 123. The windmill support die 151 can turn along the circular rail 153 in a state of being supported by a plurality of upper and lower rollers 154 and 155.

Figure 31:
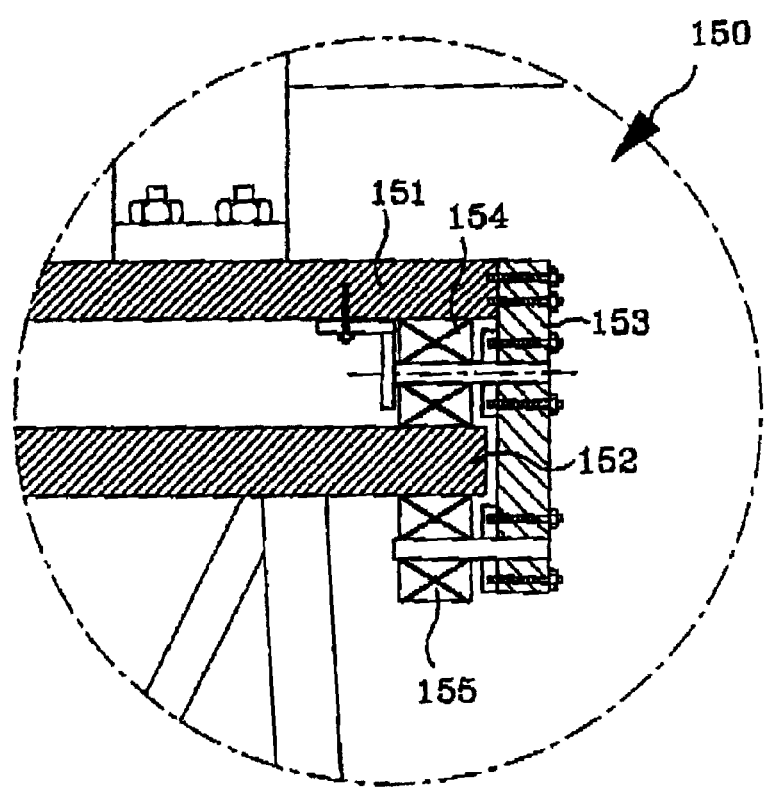
FIG. 31 is an enlarged sectional view corresponding to a portion "A" of FIG. 30.
Figure 32:
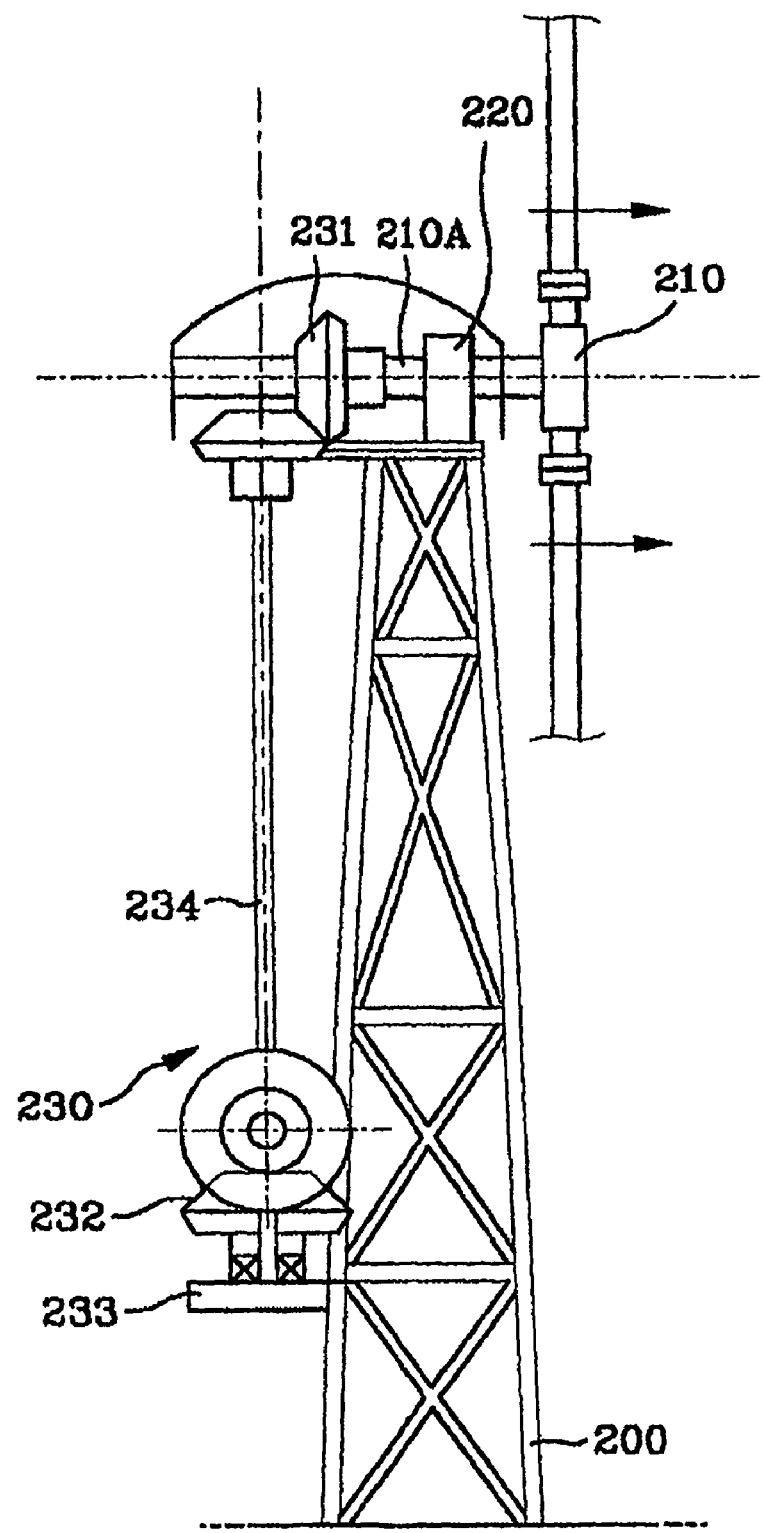
FIG. 32 is a side view illustrating a general wind power generating device.

This arrangement will be described in more detail with reference to FIG. 31. The upper and lower rollers 154 and 155 are rotatably mounted to a connecting member 152 extending downwardly from a peripheral portion of the windmill support die 151. The upper and lower rollers 154 and 155 are arranged at upper and lower portions of the connecting member 152, respectively. Each upper roller 154 is in contact with a lower surface of the windmill support die 151 and an upper surface of the circular rail 153, whereas each lower roller 155 is in contact with a lower surface of the circular rail 153. In accordance with such rolling contact, the windmill support die 151 is turnable along the circular rail 153.

Now, the operation of the wind power generating apparatus having the above described configuration according to the present invention will be described in detail with reference to the annexed drawings.

When the primary, secondary, and third-stage windmill blades 121, 122, and 123 mounted to the rotating shaft 130 are rotated by wind, as shown in FIG. 27 the rotating force generated in accordance with the rotation of those windmill blades is transmitted to the rotating shaft 130 which, in turn, transmits the rotating force to the vertical driving shaft 234 via the upper bevel gear 231 of the power transmission unit 230. The power transmitted to the driving shaft 234 is transmitted to an external wind power utilizing device via the lower bevel gear 232. During this operation, there is no eccentricity of the rotating shaft 130 caused by a possible weigh imbalance occurring at the rotating shaft 130. This is because the balance weight 131 is arranged at the front end of the rotating shaft 130 to eliminate the weight imbalance occurring at the rotating shaft 130 due to the primary-stage windmill blade 121 arranged at the front portion of the rotating shaft 130 and the secondary and third-stage windmill blade 122 and 123 arranged at the rear portion of the rotating shaft 130.

If such a weight imbalance is not eliminated, the rotating shaft 130 and third windmill blade 123 then become eccentric, thereby causing the primary, secondary, and third-stage windmill blade 121, 122, and 123 to be positioned opposite to the direction of the wind after moving along the circular rail 153 of the turning unit 150. As a result, the primary, secondary, and third-stage windmill blades 121, 122, and 123 may rotate inaccurately, and may be unstable.

Since the primary, secondary, and third-stage windmill blades 121, 122, and 123 are arranged at the front and rear portions of the rotating shaft 130 while being spaced apart from one another, an enhancement in wind power is obtained.

The windmill support die 151 of the turning unit 130 connected to the first and second bearings 141 and 142 rotatably supporting the rotating shaft 130 of the primary, secondary, and third-stage windmill blades 121, 122, and 123 is tunable along the circular rail 153 by the upper and lower rollers 154 and 155 mounted to the connecting member 152 of the windmill support die 151. By this arrangement, the primary, secondary, and third-stage windmill blades 121, 122, and 123 change their direction in accordance with a variation in wind direction. Thus, the windmill blades have an effect of coping with a variation in wind direction (FIGS. 29 to 31).

INDUSTRIAL APPLICABILITY

As apparent from the above description, the present invention provides a windmill blade capable of adjusting its orientation depending on a variation in the direction of wind such that it is directed to the wind direction, while adjusting the opening degree of wind pressure adjusting holes in accordance with the force of wind by sliding wind pressure adjusting plates such that the wind pressure adjusting holes are completely closed when the wind force is weak, thereby maximizing the wind pressure receiving area to increase the wind pressure utilizing efficiency, whereas the wind pressure adjusting holes are completely opened when the wind force is strong, thereby minimizing the wind pressure receiving area to prevent the windmill blade from being damaged by the strong wind force.

In accordance with the present invention, windmill blades are mounted in a multi-stage fashion to a rotating shaft while being spaced apart from one another to efficiently generate wind power The windmill blades are also pivotable or turnable to cope with a variation in the direction of wind, thereby being capable of achieving an enhancement in the efficiency of generating wind power.

A balance weight is provided to eliminate a possible weigh imbalance occurring at the rotating shaft due to the multi-stage windmill blades, thereby preventing the rotating shaft from being eccentric. Accordingly, it is possible to accurately and stably rotate the multi-stage windmill blades.

Although the preferred embodiments of the invention have been disclosed for illustrative purposes, those skilled in the art will appreciate that various modifications, additions and substitutions are possible, without departing from the scope and spirit of the invention as disclosed in the accompanying

What is claimed is:

1. A windmill blade comprising:
blade bodies mounted to a rotating shaft to form a blade assembly, each of the blade bodies receiving pressure of wind while being provided with a plurality of wind pressure adjusting holes;
a plurality of wind pressure adjusting plates coupled to each of the blade bodies while being connected together to an associated one of wires, each of the wind pressure adjusting plates being slidable along guides respectively arranged at opposite sides of an associated one of the wind pressure adjusting holes provided at an associated one of the blade bodies, thereby adjusting an opening degree of the associated wind pressure adjusting hole;
elastic members each adapted to connect one end of an associated one of the wires to one side portion of an associated one of the blade bodies;
winches each adapted to connect the other end of an associated one of the wires to the other side portion of an associated one of the blade bodies, the winches being mounted to a single shaft to simultaneously wind or unwind the wires; and
means for driving the winches.

2. The windmill blade according to claim 1, wherein the driving means comprises:
a pinion gear mounted to the shaft carrying the winches, and a rack gear engaged with the pinion gear; and
a cylinder connected to the rack gear, and adapted to perform extension a retraction operations for linearly moving the rack gear in accordance with a variation in wind force.

3. The windmill blade according to claim 1, wherein the driving means comprises:
a worm mounted to the shaft carrying the winches, and a worm gear engaged with the worm; and
a reduction motor connected to the worm gear, and adapted to rotate the worm gear in accordance with a variation in wind force.

4. The windmill blade according to claim 1, wherein:
the wind pressure adjusting holes formed at each of the blade bodies are arranged in several columns in a longitudinal direction of the blade body;
each of the wind pressure adjusting plates respectively associated with the wind pressure adjusting holes comprises upper and lower wind pressure adjusting plates configured to be sequentially slidable in longitudinal directions, thereby sequentially opening or closing the associated wind pressure adjusting hole; and
the lower wind pressure adjusting plate is connected to the blade body by an elastic member, the upper and lower wind pressure adjusting plates are connected to each other by engagement jaws formed at facing ends of the upper and lower wind pressure adjusting plates, and the upper wind pressure adjusting plate is connected to an associated one of the wires at an end thereof opposite to the end thereof carrying an associated one of the engagement jaws.

5. A windmill blade comprising:
blade bodies mounted to a rotating shaft to form a blade assembly, each of the blade bodies receiving pressure of wind while being provided with a plurality of wind pressure adjusting holes;
a plurality of wind pressure adjusting plates coupled to each of the blade bodies while being connected to chains each forming a loop, respectively, each of the wind pressure adjusting plates being slidable along guides respectively arranged at opposite sides of an associated one of the wind pressure adjusting holes provided at an associated one of the blade bodies, thereby adjusting an opening degree of the associated wind pressure adjusting hole;

a plurality of first sprockets mounted to one side portion of an associated one of the blade bodies, each of the first sprockets supporting one aide portion of an associated one of the chains;

a plurality of second sprockets mounted to a single shaft, each of the second sprockets supporting the other side portion of an associated one of the chains to rotate an associated one of the first sprockets in a clockwise or counterclockwise direction; and means for driving the second sprockets.

6. The windmill blade according to claim 5, wherein the driving means comprises a reduction motor directly connected to the shaft carrying the second sprockets by a coupling member.

7. The windmill blade according to claim 5, wherein the wind pressure adjusting holes formed at each of the blade bodies are arranged in a lateral direction of the blade body; each of the wind pressure adjusting plates respectively associated with the wind pressure adjusting holes comprises upper and lower wind pressure adjusting plates configured to be sequentially slidable in lateral directions, thereby sequentially opening or closing the associated wind pressure adjusting hole; and the upper and lower wind pressure adjusting plates are connected to each other by engagement jaws formed at facing ends of the upper and lower wind pressure adjusting plates, and the lower wind pressure adjusting plate is connected to an associated one of the chains, via an associated one of the first sprockets, at an end of the lower plate opposite to the end of the lower plate carrying an associated one of the engagement jaws.

8. A windmill blade comprising:

blade bodies mounted to a rotating shaft to form a blade assembly, each of the blade bodies receiving pressure of wind while being provided with a plurality of wind pressure adjusting holes;

a plurality of wind pressure adjusting plate pairs coupled to each of the blade bodies in association with the wind pressure adjusting holes, respectively, each of the wind pressure adjusting plate pairs comprising upper and lower wind pressure adjusting plates being slidable along guides respectively arranged at opposite sides of the associated wind pressure adjusting hole, thereby adjusting an opening degree of the associated wind pressure adjusting hole;

first cylinders each adapted to slide the upper wind pressure adjusting plate of an associated one of the wind pressure adjusting plate pairs along the guides associated with the associated wind pressure adjusting plate pair; and second cylinders each mounted to the upper wind pressure adjusting plate of an associated one of the wind pressure adjusting plate pair, and adapted to slide the lower wind pressure adjusting plate of the associated wind pressure adjusting plate pair along the guides associated with the associated wind pressure adjusting plate pair.

9. A wind power generating apparatus for transmitting a rotating force of windmill blades rotated by wind to a wind power utilizing device via a power transmission unit, comprising:

primary, secondary, and third windmill blades mounted to the rotating shaft on at least one iron tower while being arranged along the rotating shaft, each of the windmill blades having a configuration according to any one of claims 1 to 8; and a turning unit for turning a windmill support die connected to the rotating shaft carrying the primary, secondary, and third windmill blades along a circular rail supported by the iron tower, the windmill support die being slidably supported by upper and lower rollers.

10. The wind power generating apparatus according to claim 9, wherein the primary windmill blade is arranged at a front portion of the rotating shaft, the secondary and third windmill blades are arranged at a rear portion of the rotating shaft, and a balance weight is arranged at a front end of the rotating shaft to balance the rotating shaft.

* * * * *